United States Patent
Raj et al.

(10) Patent No.: US 10,277,386 B2
(45) Date of Patent: Apr. 30, 2019

(54) SYSTEM, DEVICES, AND METHOD FOR ON-BODY DATA AND POWER TRANSMISSION

(71) Applicant: MC10, Inc., Lexington, MA (US)

(72) Inventors: Milan Raj, Natick, MA (US); Bryan McGrane, Cambirdge, MA (US); Jeffrey Model, Cambridge, MA (US); Hoi-Cheong Steve Sun, Lexington, MA (US); Alexander J. Aranyosi, Medford, MA (US); Valerie Susan Hanson, Medford, MA (US)

(73) Assignee: MC10, Inc., Lexington, MA (US)

( * ) Notice: Subject to any disclaimer, the term of this patent is extended or adjusted under 35 U.S.C. 154(b) by 0 days.

(21) Appl. No.: 15/437,964

(22) Filed: Feb. 21, 2017

(65) Prior Publication Data
US 2017/0244543 A1     Aug. 24, 2017

Related U.S. Application Data

(60) Provisional application No. 62/298,296, filed on Feb. 22, 2016.

(51) Int. Cl.
*H04L 29/08* (2006.01)
*H04L 7/033* (2006.01)
(Continued)

(52) U.S. Cl.
CPC ........... *H04L 7/033* (2013.01); *H04B 13/005* (2013.01); *H04L 67/04* (2013.01); *H04L 67/12* (2013.01);
(Continued)

(58) Field of Classification Search
CPC ... A61B 5/0028; A61B 5/0006; A61B 5/0402; A61B 5/6833; A61B 5/04085;
(Continued)

(56) References Cited

U.S. PATENT DOCUMENTS 3,716,861 A    2/1973   Root
3,805,427 A    4/1974   Epstein
(Continued)

FOREIGN PATENT DOCUMENTS

CN          202068986 U    12/2011
DE   10 2006 011 596 A1    9/2007
(Continued)

OTHER PUBLICATIONS

U.S. Appl. No. 13/631,739, filed Sep. 28, 2012, C. Rafferty et al., Electronics For Detection Of A Property Of A Surface.
(Continued)

*Primary Examiner* — Khanh C Tran
(74) *Attorney, Agent, or Firm* — Nixon Peabody LLP

(57) ABSTRACT

An on-body sensor system includes a hub configured to be attached to a surface of a user. The hub being further configured to transmit electrical power and/or data signals into the surface and to receive response data signals from the surface. The system further including at least one sensor node configured to be attached to the surface. The sensor node being further configured to receive the electrical power and data signals from the hub through the surface and to transmit the response data signals into the surface. The electrical power from the hub can power the sensor node and cause or enable the at least one sensor node to generate sensor information that is transmitted back to the hub within the response data signals.

7 Claims, 4 Drawing Sheets

(51) Int. Cl.
*H04B 13/00* (2006.01)
*H04W 52/00* (2009.01)
*H04Q 9/00* (2006.01)

(52) U.S. Cl.
CPC .............. *H04L 67/22* (2013.01); *H04Q 9/00* (2013.01); *H04W 52/00* (2013.01); *H04Q 2209/40* (2013.01); *H04Q 2209/43* (2013.01); *Y04S 40/18* (2018.05)

(58) Field of Classification Search
CPC ..... A61B 5/0432; A61B 5/053; A61B 5/0022; A61B 5/0024; A61B 5/0408; A61B 5/042; A61B 5/145; A61B 5/0205; A61B 5/02438; H04B 13/005; H04B 1/385; G07C 2009/00809; G06F 3/011; G06F 3/041; G06K 2009/00939
See application file for complete search history.

(56) References Cited

U.S. PATENT DOCUMENTS

| | | |
|---|---|---|
| 3,838,240 A | 9/1974 | Schelhorn |
| 4,278,474 A | 7/1981 | Blakeslee |
| 4,304,235 A | 12/1981 | Kaufman |
| 4,416,288 A | 11/1983 | Freeman |
| 4,658,153 A | 4/1987 | Brosh |
| 4,911,169 A | 3/1990 | Ferrari |
| 5,059,424 A | 10/1991 | Cartmell |
| 5,272,375 A | 12/1993 | Belopolsky |
| 5,306,917 A | 4/1994 | Black |
| 5,326,521 A | 7/1994 | East |
| 5,331,966 A | 7/1994 | Bennett |
| 5,360,987 A | 11/1994 | Shibib |
| 5,471,982 A | 5/1995 | Edwards |
| 5,454,270 A | 10/1995 | Brown |
| 5,491,651 A | 2/1996 | Janic |
| 5,567,975 A | 10/1996 | Walsh |
| 5,580,794 A | 12/1996 | Allen |
| 5,617,870 A | 4/1997 | Hastings |
| 5,811,790 A | 9/1998 | Endo |
| 5,817,008 A | 10/1998 | Rafert |
| 5,907,477 A | 5/1999 | Tuttle |
| 6,063,046 A | 5/2000 | Allum |
| 6,211,799 B1 | 4/2001 | Post et al. |
| 6,220,916 B1 | 4/2001 | Bart |
| 6,265,090 B1 | 7/2001 | Nishide |
| 6,282,960 B1 | 9/2001 | Samuels |
| 6,343,514 B1 | 2/2002 | Smith |
| 6,387,052 B1 | 5/2002 | Quinn |
| 6,410,971 B1 | 6/2002 | Otey |
| 6,421,016 B1 | 7/2002 | Phillips |
| 6,450,026 B1 | 9/2002 | Desarnaud |
| 6,455,931 B1 | 9/2002 | Hamilton |
| 6,567,158 B1 | 5/2003 | Falcial |
| 6,626,940 B2 | 9/2003 | Crowley |
| 6,628,987 B1 | 9/2003 | Hill |
| 6,641,860 B1 | 11/2003 | Kaiserman |
| 6,775,906 B1 | 8/2004 | Silverbrook |
| 6,784,844 B1 | 8/2004 | Boakes |
| 6,965,160 B2 | 11/2005 | Cobbley |
| 6,987,314 B1 | 1/2006 | Yoshida |
| 7,259,030 B2 | 8/2007 | Daniels |
| 7,265,298 B2 | 9/2007 | Maghribi |
| 7,302,751 B2 | 12/2007 | Hamburgen |
| 7,337,012 B2 | 2/2008 | Maghribi |
| 7,487,587 B2 | 2/2009 | Vanfleteren |
| 7,491,892 B2 | 2/2009 | Wagner |
| 7,521,292 B2 | 4/2009 | Rogers |
| 7,557,367 B2 | 7/2009 | Rogers |
| 7,618,260 B2 | 11/2009 | Daniel |
| 7,622,367 B1 | 11/2009 | Nuzzo |
| 7,727,228 B2 | 6/2010 | Abboud |
| 7,739,791 B2 | 6/2010 | Brandenburg |
| 7,759,167 B2 | 7/2010 | Vanfleteren |
| 7,815,095 B2 | 10/2010 | Fujisawa |
| 7,960,246 B2 | 6/2011 | Flamand |
| 7,982,296 B2 | 7/2011 | Nuzzo |
| 8,097,926 B2 | 1/2012 | De Graff |
| 8,198,621 B2 | 6/2012 | Rogers |
| 8,207,473 B2 | 6/2012 | Axisa |
| 8,217,381 B2 | 7/2012 | Rogers |
| 8,332,053 B1 | 12/2012 | Patterson |
| 8,372,726 B2 | 2/2013 | De Graff |
| 8,389,862 B2 | 3/2013 | Arora |
| 8,431,828 B2 | 4/2013 | Vanfleteren |
| 8,440,546 B2 | 5/2013 | Nuzzo |
| 8,536,667 B2 | 9/2013 | De Graff |
| 8,552,299 B2 | 10/2013 | Rogers |
| 8,618,656 B2 | 12/2013 | Oh |
| 8,664,699 B2 | 3/2014 | Nuzzo |
| 8,679,888 B2 | 3/2014 | Rogers |
| 8,729,524 B2 | 5/2014 | Rogers |
| 8,754,396 B2 | 6/2014 | Rogers |
| 8,865,489 B2 | 10/2014 | Rogers |
| 8,886,334 B2 | 11/2014 | Ghaffari |
| 8,905,772 B2 | 12/2014 | Rogers |
| 9,012,784 B2 | 4/2015 | Arora |
| 9,082,025 B2 | 7/2015 | Fastert |
| 9,105,555 B2 | 8/2015 | Rogers |
| 9,105,782 B2 | 8/2015 | Rogers |
| 9,107,592 B2 | 8/2015 | Litt |
| 9,119,533 B2 | 9/2015 | Ghaffari |
| 9,123,614 B2 | 9/2015 | Graff |
| 9,159,635 B2 | 10/2015 | Elolampi |
| 9,168,094 B2 | 10/2015 | Lee |
| 9,171,794 B2 | 10/2015 | Rafferty |
| 9,186,060 B2 | 11/2015 | De Graff |
| 9,226,402 B2 | 12/2015 | Hsu |
| 9,247,637 B2 | 1/2016 | Hsu |
| 9,289,132 B2 | 3/2016 | Ghaffari |
| 9,295,842 B2 | 3/2016 | Ghaffari |
| 9,320,907 B2 | 4/2016 | Bogie |
| 9,324,733 B2 | 4/2016 | Rogers |
| 9,372,123 B2 | 6/2016 | Li |
| 9,408,305 B2 | 8/2016 | Hsu |
| 9,420,953 B2 | 8/2016 | Litt |
| 9,450,043 B2 | 9/2016 | Nuzzo |
| 9,515,025 B2 | 12/2016 | Rogers |
| 9,516,758 B2 | 12/2016 | Arora |
| 9,545,216 B2 | 1/2017 | D'Angelo et al. |
| 9,545,285 B2 | 1/2017 | Ghaffari |
| 9,554,850 B2 | 1/2017 | Lee |
| 9,579,040 B2 | 2/2017 | Rafferty |
| 9,583,428 B2 | 2/2017 | Rafferty |
| D781,270 S | 3/2017 | Li |
| 9,622,680 B2 | 4/2017 | Ghaffari |
| 9,629,586 B2 | 4/2017 | Ghaffari |
| 9,647,171 B2 | 5/2017 | Rogers |
| 9,655,560 B2 | 5/2017 | Ghaffari |
| 9,662,069 B2 | 5/2017 | De Graff |
| 9,702,839 B2 | 7/2017 | Ghaffari |
| 9,704,908 B2 | 7/2017 | De Graff |
| 9,706,647 B2 | 7/2017 | Hsu |
| 9,723,122 B2 | 8/2017 | Ghaffari |
| 9,723,711 B2 | 8/2017 | Elolampi |
| 9,750,421 B2 | 9/2017 | Ghaffari |
| 9,757,050 B2 | 9/2017 | Ghaffari |
| 2001/0012918 A1 | 8/2001 | Swanson |
| 2001/0021867 A1 | 9/2001 | Kordis |
| 2002/0000813 A1 | 1/2002 | Hirono |
| 2002/0026127 A1 | 2/2002 | Balbierz |
| 2002/0079572 A1 | 6/2002 | Khan |
| 2002/0082515 A1 | 6/2002 | Campbell |
| 2002/0094701 A1 | 7/2002 | Biegelsen |
| 2002/0107436 A1 | 8/2002 | Barton |
| 2002/0113739 A1 | 8/2002 | Howard |
| 2002/0128700 A1 | 9/2002 | Cross, Jr. |
| 2002/0145467 A1 | 10/2002 | Minch |
| 2002/0151934 A1 | 10/2002 | Levine |
| 2002/0158330 A1 | 10/2002 | Moon |
| 2002/0173730 A1 | 11/2002 | Pottgen |
| 2002/0193724 A1 | 12/2002 | Stebbings |
| 2003/0017848 A1 | 1/2003 | Engstrom |

(56) References Cited

U.S. PATENT DOCUMENTS

| | | |
|---|---|---|
| 2003/0045025 A1 | 3/2003 | Coyle |
| 2003/0097165 A1 | 5/2003 | Krulevitch |
| 2003/0120271 A1 | 6/2003 | Burnside |
| 2003/0162507 A1 | 8/2003 | Vatt |
| 2003/0214408 A1 | 11/2003 | Grajales |
| 2003/0236455 A1 | 12/2003 | Swanson |
| 2004/0006264 A1 | 1/2004 | Mojarradi |
| 2004/0085469 A1 | 5/2004 | Johnson |
| 2004/0092806 A1 | 5/2004 | Sagon |
| 2004/0106334 A1 | 6/2004 | Suzuki |
| 2004/0118831 A1 | 6/2004 | Martin |
| 2004/0135094 A1 | 7/2004 | Niigaki |
| 2004/0138558 A1 | 7/2004 | Dunki-Jacobs |
| 2004/0149921 A1 | 8/2004 | Smyk |
| 2004/0178466 A1 | 9/2004 | Merrill |
| 2004/0192082 A1 | 9/2004 | Wagner |
| 2004/0201134 A1 | 10/2004 | Kawai |
| 2004/0203486 A1 | 10/2004 | Shepherd |
| 2004/0221370 A1 | 11/2004 | Hannula |
| 2004/0238819 A1 | 12/2004 | Maghribi |
| 2004/0243204 A1 | 12/2004 | Maghribi |
| 2005/0021103 A1 | 1/2005 | DiLorenzo |
| 2005/0029680 A1 | 2/2005 | Jung |
| 2005/0067293 A1 | 3/2005 | Naito |
| 2005/0070778 A1 | 3/2005 | Lackey |
| 2005/0096513 A1 | 5/2005 | Ozguz |
| 2005/0113744 A1 | 5/2005 | Donoghue |
| 2005/0139683 A1 | 6/2005 | Yi |
| 2005/0171524 A1 | 8/2005 | Stern |
| 2005/0203366 A1 | 9/2005 | Donoghue |
| 2005/0204811 A1 | 9/2005 | Neff |
| 2005/0248312 A1 | 11/2005 | Cao |
| 2005/0261617 A1 | 11/2005 | Hall |
| 2005/0258050 A1 | 12/2005 | Bruce |
| 2005/0285262 A1 | 12/2005 | Knapp |
| 2006/0003709 A1 | 1/2006 | Wood |
| 2006/0038182 A1 | 2/2006 | Rogers |
| 2006/0071349 A1 | 4/2006 | Tokushige |
| 2006/0084394 A1 | 4/2006 | Engstrom |
| 2006/0106321 A1 | 5/2006 | Lewinsky |
| 2006/0122298 A1 | 6/2006 | Menon |
| 2006/0128346 A1 | 6/2006 | Yasui |
| 2006/0154398 A1 | 7/2006 | Qing |
| 2006/0160560 A1 | 7/2006 | Josenhans |
| 2006/0235314 A1 | 10/2006 | Migliuolo |
| 2006/0248946 A1 | 11/2006 | Howell |
| 2006/0257945 A1 | 11/2006 | Masters |
| 2006/0264767 A1 | 11/2006 | Shennib |
| 2006/0270135 A1 | 11/2006 | Chrysler |
| 2006/0276702 A1 | 12/2006 | McGinnis |
| 2006/0286785 A1 | 12/2006 | Rogers |
| 2007/0027514 A1 | 2/2007 | Gerber |
| 2007/0031283 A1 | 2/2007 | Davis |
| 2007/0108389 A1 | 5/2007 | Makela |
| 2007/0113399 A1 | 5/2007 | Kumar |
| 2007/0123756 A1 | 5/2007 | Kitajima |
| 2007/0139451 A1 | 6/2007 | Somasiri |
| 2007/0179373 A1 | 8/2007 | Pronovost |
| 2007/0190880 A1 | 8/2007 | Dubrow |
| 2007/0270672 A1 | 11/2007 | Hayter |
| 2007/0270674 A1 | 11/2007 | Kane |
| 2008/0036097 A1 | 2/2008 | Ito |
| 2008/0046080 A1 | 2/2008 | Vanden Bulcke |
| 2008/0074383 A1 | 3/2008 | Dean |
| 2008/0091089 A1 | 4/2008 | Guillory |
| 2008/0096620 A1 | 4/2008 | Lee |
| 2008/0139894 A1 | 6/2008 | Szydlo-Moore |
| 2008/0157235 A1 | 7/2008 | Rogers |
| 2008/0185534 A1 | 8/2008 | Simon |
| 2008/0188912 A1 | 8/2008 | Stone |
| 2008/0193749 A1 | 8/2008 | Thompson |
| 2008/0200973 A1 | 8/2008 | Mallozzi |
| 2008/0204021 A1 | 8/2008 | Leussler |
| 2008/0211087 A1 | 9/2008 | Mueller-Hipper |
| 2008/0237840 A1 | 10/2008 | Alcoe |
| 2008/0259576 A1 | 10/2008 | Johnson |
| 2008/0262381 A1 | 10/2008 | Kolen |
| 2008/0275327 A1 | 11/2008 | Faarbaek |
| 2008/0287167 A1 | 11/2008 | Caine |
| 2008/0297350 A1 | 12/2008 | Iwasa |
| 2008/0313552 A1 | 12/2008 | Buehler |
| 2009/0000377 A1 | 1/2009 | Shipps |
| 2009/0001550 A1 | 1/2009 | Li |
| 2009/0015560 A1 | 1/2009 | Robinson |
| 2009/0017884 A1 | 1/2009 | Rotschild |
| 2009/0048556 A1 | 2/2009 | Durand |
| 2009/0076363 A1 | 3/2009 | Bly |
| 2009/0088750 A1 | 4/2009 | Hushka |
| 2009/0107704 A1 | 4/2009 | Vanfleteren |
| 2009/0154736 A1 | 6/2009 | Lee |
| 2009/0184254 A1 | 7/2009 | Miura |
| 2009/0204168 A1 | 8/2009 | Kallmeyer |
| 2009/0215385 A1 | 8/2009 | Waters |
| 2009/0225751 A1 | 9/2009 | Koenck |
| 2009/0261828 A1 | 10/2009 | Nordmeyer-Massner |
| 2009/0273909 A1 | 11/2009 | Shin |
| 2009/0283891 A1 | 11/2009 | Dekker |
| 2009/0291508 A1 | 11/2009 | Babu |
| 2009/0294803 A1 | 12/2009 | Nuzzo |
| 2009/0317639 A1 | 12/2009 | Axisa |
| 2009/0322480 A1 | 12/2009 | Benedict |
| 2010/0002402 A1 | 1/2010 | Rogers |
| 2010/0030167 A1 | 2/2010 | Thirstrup |
| 2010/0036211 A1 | 2/2010 | La Rue |
| 2010/0059863 A1 | 3/2010 | Rogers |
| 2010/0072577 A1 | 3/2010 | Nuzzo |
| 2010/0073669 A1 | 3/2010 | Colvin |
| 2010/0087782 A1 | 4/2010 | Ghaffari |
| 2010/0090781 A1 | 4/2010 | Yamamoto |
| 2010/0090824 A1 | 4/2010 | Rowell |
| 2010/0116526 A1 | 5/2010 | Arora |
| 2010/0117660 A1 | 5/2010 | Douglas |
| 2010/0178722 A1 | 7/2010 | De Graff |
| 2010/0185055 A1* | 7/2010 | Robertson ............ A61B 5/0031 600/117 |
| 2010/0245011 A1 | 9/2010 | Chatzopoulos |
| 2010/0271191 A1 | 10/2010 | De Graff |
| 2010/0298895 A1 | 11/2010 | Ghaffari |
| 2010/0317132 A1 | 12/2010 | Rogers |
| 2010/0321161 A1 | 12/2010 | Isabell |
| 2010/0327387 A1 | 12/2010 | Kasai |
| 2011/0011179 A1 | 1/2011 | Gustafsson |
| 2011/0034760 A1 | 2/2011 | Brynelsen |
| 2011/0034912 A1 | 2/2011 | De Graff |
| 2011/0051384 A1 | 3/2011 | Kriechbaum |
| 2011/0054583 A1 | 3/2011 | Litt |
| 2011/0071603 A1 | 3/2011 | Moore |
| 2011/0098583 A1 | 4/2011 | Pandia |
| 2011/0101789 A1 | 5/2011 | Salter |
| 2011/0121822 A1 | 5/2011 | Parsche |
| 2011/0136436 A1 | 6/2011 | Hoyt |
| 2011/0140856 A1 | 6/2011 | Downie |
| 2011/0140897 A1 | 6/2011 | Purks |
| 2011/0152632 A1* | 6/2011 | Le Neel ............... A61B 5/0022 600/300 |
| 2011/0175735 A1 | 7/2011 | Forster |
| 2011/0184320 A1 | 7/2011 | Shipps |
| 2011/0185611 A1 | 8/2011 | Adams |
| 2011/0213559 A1 | 9/2011 | Pollack |
| 2011/0215931 A1 | 9/2011 | Callsen |
| 2011/0218756 A1 | 9/2011 | Calisen |
| 2011/0218757 A1 | 9/2011 | Calisen |
| 2011/0220890 A1 | 9/2011 | Nuzzo |
| 2011/0222375 A1 | 9/2011 | Tsubata |
| 2011/0263950 A1 | 10/2011 | Larson |
| 2011/0277813 A1 | 11/2011 | Rogers |
| 2011/0284268 A1 | 11/2011 | Palaniswamy |
| 2011/0306851 A1 | 12/2011 | Wang |
| 2011/0317737 A1 | 12/2011 | Klewer |
| 2012/0016258 A1 | 1/2012 | Webster |
| 2012/0051005 A1 | 3/2012 | Vanfleteren |
| 2012/0052268 A1 | 3/2012 | Axisa |
| 2012/0065937 A1 | 3/2012 | De Graff |
| 2012/0074546 A1 | 3/2012 | Chong |

(56) References Cited

U.S. PATENT DOCUMENTS

| | | |
|---|---|---|
| 2012/0087216 A1 | 4/2012 | Keung |
| 2012/0091594 A1 | 4/2012 | Landesberger |
| 2012/0092178 A1 | 4/2012 | Calisen |
| 2012/0092222 A1 | 4/2012 | Kato |
| 2012/0101413 A1 | 4/2012 | Beetel |
| 2012/0101538 A1 | 4/2012 | Ballakur |
| 2012/0108012 A1 | 5/2012 | Yasuda |
| 2012/0126418 A1 | 5/2012 | Feng |
| 2012/0150072 A1 | 6/2012 | Revol-Cavalier |
| 2012/0150074 A1 | 6/2012 | Yanev |
| 2012/0157804 A1 | 6/2012 | Rogers |
| 2012/0165759 A1 | 6/2012 | Rogers |
| 2012/0172697 A1 | 7/2012 | Urman |
| 2012/0178367 A1 | 7/2012 | Matsumoto |
| 2012/0206097 A1 | 8/2012 | Scar |
| 2012/0215127 A1 | 8/2012 | Shikida |
| 2012/0220835 A1 | 8/2012 | Chung |
| 2012/0226130 A1 | 9/2012 | De Graff |
| 2012/0244848 A1 | 9/2012 | Ghaffari |
| 2012/0245444 A1 | 9/2012 | Otis |
| 2012/0256308 A1 | 10/2012 | Helin |
| 2012/0256492 A1 | 10/2012 | Song |
| 2012/0316455 A1 | 12/2012 | Rahman |
| 2012/0327608 A1 | 12/2012 | Rogers |
| 2013/0035751 A1 | 2/2013 | Shalev |
| 2013/0041235 A1 | 2/2013 | Rogers |
| 2013/0044215 A1 | 2/2013 | Rothkopf |
| 2013/0085552 A1 | 4/2013 | Mandel |
| 2013/0099358 A1 | 4/2013 | Elolampi |
| 2013/0100618 A1 | 4/2013 | Rogers |
| 2013/0116520 A1 | 5/2013 | Roham |
| 2013/0118255 A1 | 5/2013 | Callsen |
| 2013/0123587 A1 | 5/2013 | Sarrafzadeh |
| 2013/0150693 A1 | 6/2013 | D'angelo |
| 2013/0185003 A1 | 7/2013 | Carbeck |
| 2013/0192356 A1 | 8/2013 | De Graff |
| 2013/0197319 A1 | 8/2013 | Monty |
| 2013/0200268 A1 | 8/2013 | Rafferty |
| 2013/0211761 A1 | 8/2013 | Brandsma |
| 2013/0214300 A1 | 8/2013 | Lerman |
| 2013/0215467 A1 | 8/2013 | Fein |
| 2013/0225965 A1 | 8/2013 | Ghaffari |
| 2013/0237150 A1 | 9/2013 | Royston |
| 2013/0245387 A1 | 9/2013 | Patel |
| 2013/0245388 A1 | 9/2013 | Rafferty |
| 2013/0253285 A1 | 9/2013 | Bly |
| 2013/0261415 A1 | 10/2013 | Ashe |
| 2013/0261464 A1 | 10/2013 | Singh |
| 2013/0274562 A1 | 10/2013 | Ghaffari |
| 2013/0285836 A1 | 10/2013 | Proud |
| 2013/0313713 A1 | 11/2013 | Arora |
| 2013/0316442 A1 | 11/2013 | Meurville |
| 2013/0316487 A1 | 11/2013 | De Graff |
| 2013/0316645 A1 | 11/2013 | Li |
| 2013/0320503 A1 | 12/2013 | Nuzzo |
| 2013/0321373 A1 | 12/2013 | Yoshizumi |
| 2013/0325357 A1 | 12/2013 | Walerow |
| 2013/0328219 A1 | 12/2013 | Chau |
| 2013/0331914 A1 | 12/2013 | Lee |
| 2014/0001058 A1 | 1/2014 | Ghaffari |
| 2014/0012160 A1 | 1/2014 | Ghaffari |
| 2014/0012242 A1 | 1/2014 | Lee |
| 2014/0022746 A1 | 1/2014 | Hsu |
| 2014/0029652 A1* | 1/2014 | Hwang ............... H04L 7/0331 375/219 |
| 2014/0039290 A1 | 2/2014 | De Graff |
| 2014/0097944 A1 | 4/2014 | Fastert |
| 2014/0110859 A1 | 4/2014 | Rafferty |
| 2014/0125458 A1 | 5/2014 | Bachman |
| 2014/0140020 A1 | 5/2014 | Rogers |
| 2014/0188426 A1 | 7/2014 | Fastert |
| 2014/0191236 A1 | 7/2014 | Nuzzo |
| 2014/0206976 A1 | 7/2014 | Thompson |
| 2014/0216524 A1 | 8/2014 | Rogers |
| 2014/0240932 A1 | 8/2014 | Hsu |
| 2014/0249520 A1 | 9/2014 | Ghaffari |
| 2014/0275835 A1 | 9/2014 | Lamego |
| 2014/0303452 A1 | 10/2014 | Ghaffari |
| 2014/0303680 A1 | 10/2014 | Donnelly |
| 2014/0308930 A1 | 10/2014 | Tran |
| 2014/0340857 A1 | 11/2014 | Hsu |
| 2014/0350883 A1 | 11/2014 | Carter |
| 2014/0371547 A1 | 12/2014 | Gartenberg |
| 2014/0374872 A1 | 12/2014 | Rogers |
| 2014/0375465 A1 | 12/2014 | Fenuccio |
| 2015/0001462 A1 | 1/2015 | Rogers |
| 2015/0019135 A1 | 1/2015 | Kacyvenski |
| 2015/0025394 A1 | 1/2015 | Hong |
| 2015/0035680 A1 | 2/2015 | Li |
| 2015/0035743 A1 | 2/2015 | Rosener |
| 2015/0069617 A1 | 3/2015 | Arora |
| 2015/0099976 A1 | 4/2015 | Ghaffari |
| 2015/0100135 A1 | 4/2015 | Ives |
| 2015/0150505 A1 | 6/2015 | Kaskoun |
| 2015/0164377 A1 | 6/2015 | Nathan |
| 2015/0181700 A1 | 6/2015 | Rogers |
| 2015/0194817 A1 | 7/2015 | Lee |
| 2015/0205931 A1* | 7/2015 | Wang ............... G16H 40/63 702/19 |
| 2015/0237711 A1 | 8/2015 | Rogers |
| 2015/0241288 A1 | 8/2015 | Keen |
| 2015/0248833 A1 | 9/2015 | Arne |
| 2015/0257647 A1* | 9/2015 | Buck ............... A61B 5/0028 600/388 |
| 2015/0260713 A1 | 9/2015 | Ghaffari |
| 2015/0272652 A1 | 10/2015 | Ghaffari |
| 2015/0286913 A1 | 10/2015 | Fastert |
| 2015/0320472 A1 | 11/2015 | Ghaffari |
| 2015/0335254 A1 | 11/2015 | Fastert |
| 2015/0342036 A1 | 11/2015 | Elolampi |
| 2016/0015962 A1 | 1/2016 | Shokoueinejad Maragheh |
| 2016/0027834 A1 | 1/2016 | Graff |
| 2016/0045162 A1 | 2/2016 | De Graff |
| 2016/0081192 A1 | 3/2016 | Hsu |
| 2016/0086909 A1 | 3/2016 | Garlock |
| 2016/0095652 A1 | 4/2016 | Lee |
| 2016/0099214 A1 | 4/2016 | Dalal |
| 2016/0099227 A1 | 4/2016 | Dalal |
| 2016/0111353 A1 | 4/2016 | Rafferty |
| 2016/0135740 A1 | 5/2016 | Ghaffari |
| 2016/0178251 A1 | 6/2016 | Johnson |
| 2016/0213262 A1 | 7/2016 | Ghaffari |
| 2016/0213424 A1 | 7/2016 | Ghaffari |
| 2016/0228640 A1 | 8/2016 | Pindado |
| 2016/0232807 A1 | 8/2016 | Ghaffari |
| 2016/0240061 A1 | 8/2016 | Li |
| 2016/0249174 A1 | 8/2016 | Patel |
| 2016/0256070 A1 | 9/2016 | Murphy |
| 2016/0284544 A1 | 9/2016 | Nuzzo |
| 2016/0287177 A1 | 10/2016 | Huppert |
| 2016/0293794 A1 | 10/2016 | Nuzzo |
| 2016/0309594 A1 | 10/2016 | Hsu |
| 2016/0322283 A1 | 11/2016 | McMahon |
| 2016/0338646 A1 | 11/2016 | Lee |
| 2016/0361015 A1 | 12/2016 | Wang |
| 2016/0371957 A1 | 12/2016 | Ghaffari |
| 2016/0381789 A1 | 12/2016 | Rogers |
| 2017/0019988 A1 | 1/2017 | McGrane |
| 2017/0049397 A1 | 2/2017 | Sun |
| 2017/0071491 A1 | 3/2017 | Litt |
| 2017/0079588 A1 | 3/2017 | Ghaffari |
| 2017/0079589 A1 | 3/2017 | Ghaffari |
| 2017/0083312 A1 | 3/2017 | Pindado |
| 2017/0086747 A1 | 3/2017 | Ghaffari |
| 2017/0086748 A1 | 3/2017 | Ghaffari |
| 2017/0086749 A1 | 3/2017 | Ghaffari |
| 2017/0095670 A1 | 4/2017 | Ghaffari |
| 2017/0095732 A1 | 4/2017 | Ghaffari |
| 2017/0105795 A1 | 4/2017 | Lee |
| 2017/0110417 A1 | 4/2017 | Arora |
| 2017/0126282 A1* | 5/2017 | Fromm ............... H04B 5/0037 |
| 2017/0164865 A1 | 6/2017 | Rafferty |
| 2017/0186727 A1 | 6/2017 | Dalal |
| 2017/0188942 A1 | 7/2017 | Ghaffari |

(56) References Cited

U.S. PATENT DOCUMENTS

| | | |
|---|---|---|
| 2017/0200670 A1 | 7/2017 | Rafferty |
| 2017/0200707 A1 | 7/2017 | Rogers |
| 2017/0223846 A1 | 8/2017 | Elolampi |
| 2017/0244285 A1 | 8/2017 | Raj |
| 2017/0244543 A1 | 8/2017 | Raj |

FOREIGN PATENT DOCUMENTS

| | | |
|---|---|---|
| DE | 10 2007 046 886 A1 | 4/2009 |
| DE | 10 2008 044 902 A1 | 3/2010 |
| EP | 0585670 A2 | 3/1994 |
| EP | 0779059 A1 | 6/1997 |
| EP | 1808124 A2 | 7/2007 |
| EP | 2259062 A2 | 12/2010 |
| EP | 2498196 A2 | 9/2012 |
| EP | 2541995 A1 | 1/2013 |
| JP | 05-087511 A | 4/1993 |
| JP | 2005-052212 A | 3/2005 |
| JP | 2009-170173 A | 7/2009 |
| WO | WO 1999/038211 A2 | 7/1999 |
| WO | WO 2002/047162 A2 | 6/2002 |
| WO | WO 2003/021679 A2 | 3/2003 |
| WO | WO 2004/084720 A2 | 10/2004 |
| WO | WO 2005/083546 A1 | 9/2005 |
| WO | WO 2005/122285 A2 | 12/2005 |
| WO | WO 2007/003019 A2 | 1/2007 |
| WO | WO 2007/024983 A2 | 3/2007 |
| WO | WO 2007/116344 A1 | 10/2007 |
| WO | WO 2007/136726 A2 | 11/2007 |
| WO | WO 2008/030960 A2 | 3/2008 |
| WO | WO 2008/055212 A2 | 5/2008 |
| WO | WO 2009/036260 A1 | 3/2009 |
| WO | WO 2009/111641 A1 | 9/2009 |
| WO | WO 2009/114689 A1 | 9/2009 |
| WO | WO 2010/036807 A1 | 4/2010 |
| WO | WO 2010/042653 A1 | 4/2010 |
| WO | WO 2010/042957 A2 | 4/2010 |
| WO | WO 2010/046883 A1 | 4/2010 |
| WO | WO 2010/056857 A2 | 5/2010 |
| WO | WO 2010/081137 A2 | 7/2010 |
| WO | WO 2010/082993 A2 | 7/2010 |
| WO | WO 2010/102310 A2 | 9/2010 |
| WO | WO 2010/132552 A1 | 11/2010 |
| WO | WO 2011/003181 A1 | 1/2011 |
| WO | WO 2011/041727 A1 | 4/2011 |
| WO | WO 2011/084450 A1 | 7/2011 |
| WO | WO 2011/084709 A1 | 7/2011 |
| WO | WO 2011/124898 A1 | 10/2011 |
| WO | WO 2011/127331 A2 | 10/2011 |
| WO | WO 2012/125494 A2 | 9/2012 |
| WO | WO 2012/166686 A2 | 12/2012 |
| WO | WO 2013/010171 A1 | 1/2013 |
| WO | WO 2013/022853 A1 | 2/2013 |
| WO | WO 2013/033724 A1 | 3/2013 |
| WO | WO 2013/034987 A3 | 3/2013 |
| WO | WO 2013/049716 A1 | 4/2013 |
| WO | WO 2013/052919 A2 | 4/2013 |
| WO | WO 2013/144738 A2 | 10/2013 |
| WO | WO 2013/144866 A1 | 10/2013 |
| WO | WO 2013/170032 A2 | 11/2013 |
| WO | WO 2014/007871 A1 | 1/2014 |
| WO | WO 2014/058473 A1 | 4/2014 |
| WO | WO 2014/059032 A1 | 4/2014 |
| WO | WO 2014/106041 A1 | 7/2014 |
| WO | WO 2014/110176 A1 | 7/2014 |
| WO | WO 2014/124044 A1 | 8/2014 |
| WO | WO 2014/124049 A2 | 8/2014 |
| WO | WO 2014/130928 A2 | 8/2014 |
| WO | WO 2014/130931 A1 | 8/2014 |
| WO | WO 2014/186467 A2 | 11/2014 |
| WO | WO 2014/197443 A1 | 12/2014 |
| WO | WO 2014/205434 A2 | 12/2014 |
| WO | WO 2015/021039 A1 | 2/2015 |
| WO | WO 2015/054312 A1 | 4/2015 |
| WO | WO 2015/077559 A1 | 5/2015 |
| WO | WO 2015/080991 A1 | 6/2015 |
| WO | WO 2015/102951 A2 | 7/2015 |
| WO | WO 2015/103483 A1 | 7/2015 |
| WO | WO 2015/103580 A2 | 7/2015 |
| WO | WO 2015/127458 A1 | 8/2015 |
| WO | WO 2015/134588 A1 | 9/2015 |
| WO | WO 2015/138712 A1 | 9/2015 |
| WO | WO 2015/145471 A1 | 10/2015 |
| WO | WO 2016/048888 A1 | 3/2016 |
| WO | WO 2016/054512 A1 | 4/2016 |
| WO | WO 2016/057318 A1 | 4/2016 |
| WO | WO 2016/081244 A1 | 5/2016 |
| WO | WO 2016/0127050 A1 | 8/2016 |
| WO | WO 2016/134306 A1 | 8/2016 |
| WO | WO 2016-140961 A1 | 9/2016 |
| WO | WO 2016/205385 A1 | 12/2016 |
| WO | WO 2017/015000 A1 | 1/2017 |
| WO | WO 2017/059215 A1 | 4/2017 |
| WO | WO 2017/062508 A1 | 4/2017 |

OTHER PUBLICATIONS

U.S. Appl. No. 13/844,508, filed Mar. 15, 2013, S. Fastert et al., Monitoring Hit Count for Impact Events.

U.S. Appl. No. 14/294,808, filed Jun. 3, 2014, I. Kacyvenski et al., Motion Sensor and Analysis.

U.S. Appl. No. 14/311,686, filed Jun. 23, 2014, J. Fenuccio et al., Band With Conformable Electronics.

U.S. Appl. No. 14/510,868, filed Oct. 9, 2014, B. Ives, Utility Gear Including Conformal Sensors.

U.S. Appl. No. 14/524,817, filed Oct. 27, 2014, X. Li et al., Conformal Electronic Devices.

U.S. Appl. No. 14/588,765, filed Jan. 2, 2015, S. Lee et al., Integrated Devices for Low Power Quantitative Measurements.

U.S. Appl. No. 14/630,335, filed Feb. 24, 2015, B. Keen, Conformal Electronics with Deformation Indicators.

U.S. Appl. No. 14/656,046, filed Mar. 12, 2015, R. Ghaffari et al., Quantification of a Change in Assay.

U.S. Appl. No. 14/726,142, filed May 29, 2015, Ghaffari et al., Cardiac Catheter Employing Conformal Electronics for Mapping.

U.S. Appl. No. 14/746,659, filed Jun. 22, 2015, Fastert et al., Conformal Electronics Integrated With Apparel.

U.S. Appl. No. 14/758,946, filed Jul. 1, 2015, S. Fastert et al., Application for Monitoring a Property of a Surface.

U.S. Appl. No. 14/859,680, filed Sep. 21, 2015, D. Garlock, Methods and Apparatuses for Shaping and Looping Bonding Wires That Serve as Stretchable and Bendable Interconnects.

U.S. Appl. No. 14/870,719, filed Sep. 30, 2015, M. Dalal et al., Flexible Electronic Circuits With Embedded Integrated Circuit Die and Methods of Making and Using the Same.

U.S. Appl. No. 14/870,802, filed Sep. 30, 2015, M. Dalal et al., Flexible Interconnects for Modules of Integrated Circuits and Methods of Making and Using the Same.

U.S. Appl. No. 15/003,644, filed Jan. 21, 2016, Roozbeh Ghaffari et al., Methods of Detecting Parameters of a Lumen.

U.S. Appl. No. 15/016,937, filed Feb. 5, 2016, Jesus Pindado et al., Method and System for Interacting with an Environment.

U.S. Appl. No. 15/047,314, filed Feb. 18, 2016, Roozbeh Ghaffari et al., Catheter or Guidewire Device Including Flow Sensing and Use Thereof.

U.S. Appl. No. 15/048,576, filed Feb. 19, 2016, Shyamal Patel et al., Automated Detection and Configuration of Wearable Devices Based on-Body Status, Location, and/or Orientation.

U.S. Appl. No. 15/057,762, filed Mar. 1, 2016, Brian Murphy et al., Perspiration Sensor.

U.S. Appl. No. 15/023,556, filed Mar. 21, 2016, Roozbeh Ghaffari, Conformal Sensor Systems for Sensing and Analysis.

U.S. Appl. No. 15/139,256, filed Apr. 26, 2016, Xia Li et al., Flexible Temperature Sensor Including Conformable Electronics.

U.S. Appl. No. 15/038,401, filed May 20, 2016, Huppert et al., Conformal Sensor Systems for Sensing and Analysis of Cardiac Activity.

U.S. Appl. No. 15/160,631, filed May 20, 2016, Lee et al., Ultra-Thin Wearable Sensing Device.

(56) References Cited

OTHER PUBLICATIONS

U.S. Appl. No. 15/183,513, filed Jun. 15, 2016, Wang et al., Moisture Wicking Adhesives for Skin Mounted Devices.
U.S. Appl. No. 15/189,461, filed Jun. 22, 2016, Ghaffari et al., Method and System for Structural Health Monitoring.
U.S. Appl. No. 15/194,995, filed Jun. 28, 2016, Hsu et al., Strain Isolation Structures for Stretchable Electronics.
U.S. Appl. No. 15/208,444, filed Jul. 12, 2016, McGrane et al., Conductive Stiffener, Method of Making a Conductive Stiffener, and Conductive Adhesive and Encapsulation Layers.
U.S. Appl. No. 15/238,488, filed Aug. 16, 2016, Sun et al., Wearable Heat Flux Devices and Methods of Use.
U.S. Appl. No. 15/119,559, filed Aug. 17, 2016, Elolampi et al., Multi-Part Flexible Encapsulation Housing for Electronic Devices.
U.S. Appl. No. 15/272,816, filed Sep. 22, 2016, Pindado et al., Method and System for Crowd-Sourced Algorithm Development.
U.S. Appl. No. 15/281,960, filed Sep. 30, 2016, Ghaffari et al., Method and System for Interacting with a Virtual Environment.
U.S. Appl. No. 15/286,129, filed Oct. 5, 2016, Ghaffari et al., Method and System for Neuromodulation and Stimulation.
U.S. Appl. No. 15/337, filed Oct. 28, 2016, Arora et al, Extremely Stretchable Electronics.
U.S. Appl. No. 15/108,861, filed Jun. 29, 2016, McMahon et al, Encapsulated Conformal Electronic Systems and Devices, and Methods of Making and Using the Same.
U.S. Appl. No. 15/369,627, filed Dec. 5, 2016, Ghaffari et al., Cardiac Catheter Employing Conformal Electronics for Mapping.
U.S. Appl. No. 15/369,668, filed Dec. 5, 2016, Ghaffari et al., Cardiac Catheter Employing Conformal Electronics for Mapping.
U.S. Appl. No. 15/373,159, filed Dec. 8, 2016, Ghaffari et al., Catheter Balloon Methods and Apparatus Employing Sensing Elements.
U.S. Appl. No. 15/373,162, filed Dec. 8, 2016, Ghaffari et al., Catheter Balloon Methods and Apparatus Employing Sensing Elements.
U.S. Appl. No. 15/373,165, filed Dec. 8, 2016, Ghaffari et al., Catheter Balloon Methods and Apparatus Employing Sensing Elements.
U.S. Appl. No. 15/382,949, filed Dec. 19, 2016, Lee et al., Catheter Device Including Flow Sensing.
U.S. Appl. No. 15/405,166, filed Jan. 12, 2017, Rafferty et al., Electronics for Detection of a Condition of Tissue.
U.S. Appl. No. 15/413,218, filed Jan. 23, 2017, Rafferty et al, Electronics for Detection of a Condition of Tissue.
U.S. Appl. No. 15/412,993, filed Jan. 23, 2017, Rafferty et al., Embedding Thin Chips in Polymer.
U.S. Appl. No. 29/592,481, filed Jan. 31, 2017, Li et al., Electronic Device Having Antenna.
U.S. Appl. No. 15/433,873, filed Feb. 15, 2017, Rafferty et al., Electronics for Detection of a Condition of Tissue.
U.S. Appl. No. 15/437,964, filed Feb. 21, 2017, Raj et al., System, Devices, and Method for On-Body Data and Power Transmission.
U.S. Appl. No. 15/437,967, filed Feb. 21, 2017, Raj et al., System, Device, and Method for Coupled Hub and Sensor Node On-Body Acquisition of Sensor Information.
U.S. Appl. No. 15/457,852, filed Mar. 13, 2017, Dalal et al., Discrete Flexible Interconnects for Modules of Integrated Circuits.
U.S. Appl. No. 15/464,006, filed Mar. 20, 2017, Ghaffari et al., Systems, Methods, and Devices Using Stretchable or Flexible Electronics for Medical Applications.
U.S. Appl. No. 15/491,379, filed Apr. 19, 2017, Ghaffari et al., Method and System for Measuring Perspiration.
U.S. Appl. No. 15/498,941, filed Apr. 27, 2017, De Graff et al., Systems, Methods, and Devices Having Stretchable Integrated Circuitry for Sensing and Delivering Therapy.
U.S. Appl. No. 15/526,375, filed May 12, 2017, Aranyosi et al., System, Device, and Method for Electronic Device Activation.
U.S. Appl. No. 15/612,458, filed Jun. 2, 2017, Ghaffari et al., Integrated Devices to Facilitate Quantitative Assays and Diagnostics.
U.S. Appl. No. 15/614,469, filed Jun. 5, 2017, Hsu et al., Conformal Electronics Including Nested Serpentine Interconnects.
U.S. Appl. No. 15/620,181, filed Jun. 12, 2017, De Graff et al., Methods and Applications of Non-Planar Imaging Arrays.
U.S. Appl. No. 15/661,172, filed Jul. 27, 2017, Ghaffari et al., Catheter Balloon Employing Force Sensing Elements.
U.S. Appl. No. 12/968,637, filed Dec. 15, 2010, J. Rogers, High-Speed, High-Resolution Electrophysiology In-Vivo Using Conformal Electronics.
U.S. Appl. No. 13/492,636, filed Jun. 8, 2012, J. Rogers, Flexible and Stretchable Electronic Systems for Epidermal Electronics.
U.S. Appl. No. 14/155,010, filed Jan. 14, 2014, R. Nuzzo, Methods and Devices for Fabricating and Assembling Printable Semiconductor Elements.
U.S. Appl. No. 14/521,319, filed Oct. 22, 2014, J. Rogers, Stretchable and Foldable Electronic Devices.
U.S. Appl. No. 14/706,733, filed May 7, 2015, J. Rogers, Stretchable and Foldable Electronic Devices.
U.S. Appl. No. 15/084,211, filed Mar. 29, 2016, R. Nuzzo, Methods and Devices for Fabricating and Assembling Printable Semiconductor Elements.
U.S. Appl. No. 15/084,091, filed Mar. 29, 2016, R. Nuzzo, Methods and Devices for Fabricating and Assembling Printable Semiconductor Elements.
U.S. Appl. No. 15/084,112, filed Mar. 29, 2016, J. Rogers, Controlled Buckling Structures in Semiconductor Interconnects and Nanomembranes for Stretchable Electronics.
U.S. Appl. No. 15/217,121, filed Jul. 22, 2016, B. Litt, Flexible and Scalable Sensor Arrays for Recording and Modulating Physiologic Activity.
U.S. Appl. No. 15/339,338, filed Oct. 31, 2016, J. Rogers, A Stretchable Form of Single Crystal Silicon for High Performance Electronics on Rubber.
U.S. Appl. No. 15/470,780, filed Mar. 27, 2017, J. Rogers, Printed Assemblies of Ultrathin, Microscale Inorganic Light Emitting Diodes for Deformable and Semitransparent Displays.
U.S. Appl. No. 14/640,206, filed Jun. 30, 2017, R. Nuzzo, Methods and Devices for Fabricating and Assembling Printable Semiconductor Elements.
Carvalhal et al., "Electrochemical Detection in a Paper-Based Separation Device", Analytical Chemistry, vol. 82, No. 3, (1162-1165) (4 pages) (Jan. 7, 2010).
Demura et al., "Immobilization of Glucose Oxidase with *Bombyx Mori* Silk Fibroin by Only Stretching Treatment and its Application to Glucose Sensor," Biotechnology and Bioengineering, vol. 33, 598-603 (6 pages) (1989).
Ellerbee et al., "Quantifying Colorimetric Assays in Paper-Based Microfluidic Devices by Measuring the Transmission of Light through Paper," Analytical Chemistry, vol. 81, No. 20 8447-8452, (6 pages) (Oct. 15, 2009).
Halsted, "Ligature and Suture Material," Journal of the American Medical Association, vol. LX, No. 15, 1119-1126, (8 pages) (Apr. 12, 1913).
Kim et al., "Complementary Metal Oxide Silicon Integrated Circuits Incorporating Monolithically Integrated Stretchable Wavy Interconnects," Applied Physics Letters, vol. 93, 044102-044102.3 (3 pages) (Jul. 31, 2008).
Kim et al., "Dissolvable Films of Silk Fibroin for Ultrathin Conformal Bio-Integrated Electronics," Nature, 1-8 (8 pages) (Apr. 18, 2010).
Kim et al., "Materials and Noncoplanar Mesh Designs for Integrated Circuits with Linear Elastic Responses to Extreme Mechanical Deformations," PNAS, vol. 105, No. 48, 18675-18680 (6 pages) (Dec. 2, 2008).
Kim et al., "Stretchable and Foldable Silicon Integrated Circuits," Science, vol. 320, 507-511 (5 pages) (Apr. 25, 2008).
Kim et al., "Electrowetting on Paper for Electronic Paper Display," ACS Applied Materials & Interfaces, vol. 2, No. 11, (3318-3323) (6 pages) (Nov. 24, 2010).
Ko et al., "A Hemispherical Electronic Eye Camera Based on Compressible Silicon Optoelectronics," Nature, vol. 454, 748-753 (6 pages) (Aug. 7, 2008).

(56) References Cited

OTHER PUBLICATIONS

Lawrence et al., "Bioactive Silk Protein Biomaterial Systems for Optical Devices," Biomacromolecules, vol. 9, 1214-1220 (7 pages) (Nov. 4, 2008).
Meitl et al., "Transfer Printing by Kinetic Control of Adhesion to an Elastomeric Stamp," Nature, vol. 5, 33-38 (6 pages) (Jan. 2006).
Omenetto et al., "A New Route for Silk," Nature Photonics, vol. 2, 641-643 (3 pages) (Nov. 2008).
Omenetto et al., "New Opportunities for an Ancient Material," Science, vol. 329, 528-531 (5 pages) (Jul. 30, 2010).
Siegel et al., "Foldable Printed Circuit Boards on Paper Substrates," Advanced Functional Materials, vol. 20, No. 1, 28-35, (8 pages) (Jan. 8, 2010).
Tsukada et al., "Structural Changes of Silk Fibroin Membranes Induced by Immersion in Methanol Aqueous Solutions," Journal of Polymer Science, vol. 32, 961-968 (8 pages) (1994).
Wang et al., "Controlled Release From Multilayer Silk Biomaterial Coatings to Modulate Vascular Cell Responses" Biomaterials, 29, 894-903 (10 pages) (Nov. 28, 2008).
Wikipedia, "Ball bonding" article [online]. Cited in PCT/US2015/051210 search report dated Mar. 1, 2016 with the following information "Jun. 15, 2011 [retrieved on Nov. 15, 2015}. Retrieved 12-18, 29 from the Internet: <URL: https://web.archive.org/web/20110615221003/hltp://en_wikipedia.org/wiki/Ball_bonding>., entire document, especially para 1, 4, 5, 6," 2 pages, last page says ("last modified on May 11, 2011").
Bossuyt et al., "Stretchable Electronics Technology for Large Area Applications: Fabrication and Mechanical Characterizations", vol. 3, pp. 229-235 (7 pages) (Feb. 2013).
Jones et al., "Stretchable Interconnects for Elastic Electronic Surfaces". vol. 93, pp. 1459-1467 (9 pages) (Aug. 2005).
Lin et al., "Design and Fabrication of Large-Area, Redundant, Stretchable Interconnect Meshes Using Excimer Laser Photoablation and In Situ Masking", (10 pages) (Aug. 2010).
Kim et al., "A Biaxial Stretchable Interconnect With Liquid-Alloy-Covered Joints on Elastomeric Substrate", vol. 18, pp. 138-146 (9 pages) (Feb. 2009).
International Search Report and Written Opinion of International Searching Authority for Application No. PCT/US17/18672, dated May 10, 2017 (11 pages).

\* cited by examiner

SYSTEM, DEVICES, AND METHOD FOR ON-BODY DATA AND POWER TRANSMISSION

CROSS-REFERENCE TO RELATED APPLICATIONS

The present application claims priority to and the benefit of U.S. Provisional Application No. 62/298,296, filed Feb. 22, 2016, entitled, "SYSTEM, DEVICES, AND METHOD FOR ON-BODY DATA AND POWER TRANSMISSION," which is hereby incorporated by reference herein in its entirety.

FIELD OF THE INVENTION

The present disclosure relates to on-body, multi-sensor networks. In particular, the present disclosure relates to the delivery of electrical power and data signals within an on-body, multi-sensor network.

BACKGROUND OF THE INVENTION

With advancements in the manufacturing of semiconductor devices, such devices are becoming smaller and more versatile. These devices are spurring advancements in different and new technological areas. One technological area is wearable devices. Despite the advancements in the semiconductor devices themselves, however, the current state of power sources still imposes limitations on the semiconductor devices. In the field of wearable devices, the form factor and longevity of wearable devices are directly related to the on-board power sources. The power sources for wearable devices are typically in the form of bulky (relative to the size of the wearable devices), non-conformal batteries, such as lithium ion batteries. The size of the batteries drives the overall form factor of the wearable devices to be large, bulky, and/or non-conformal, which imposes limitations and constraints on the overall functionality of the wearable devices.

Therefore, there is a continuing need for developing systems, methods, and devices that solve the above and related problems.

SUMMARY OF THE INVENTION

According to some embodiments, an on-body sensor system includes a hub and at least one sensor node. The hub is configured to be attached to a surface (e.g., the skin) of a user. The hub is further configured to transmit electrical power and/or data signals into the surface (and through the skin) and to receive power and/or data signals transmitted through skin to the surface. The at least one sensor node is configured to be attached to the surface. The at least one sensor node is further configured to receive the electrical power and/or data signals from the hub through the surface and to transmit the response data signals into the surface (and through the skin). The electrical power from the hub powers the at least one sensor node and causes the at least one sensor node to generate sensor information that is transmitted back to the hub within the response data signals.

According to some embodiments, a method of synchronizing nodes within an on-body sensor network is disclosed. The method includes transmitting, by a master hub located on a surface (e.g., skin) of a user, an initialization electrical current pulse into the surface. The method further includes receiving, by at least one sensor node located on the surface, the initialization electrical current pulse from the surface. The method further includes transmitting, by the at least one sensor node, an acknowledgment electrical current pulse into the surface after a pre-determined delay and in response to receipt of the initialization electrical current pulse. The method further includes detecting, by the master hub, the acknowledgment electrical current pulse, and transmitting, by the master hub, a triggering electrical current pulse into the surface. The triggering electrical current pulse including electrical power and data. The method further includes receiving, by the at least one sensor node, the triggering electrical current pulse from the surface. The electrical power and data triggering the at least one sensor node to begin generating sensor information.

Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The invention will be better understood from the following description of exemplary embodiments together with reference to the accompanying drawings, in which.

DETAILED DESCRIPTION OF THE ILLUSTRATED EMBODIMENTS

Figure 1:
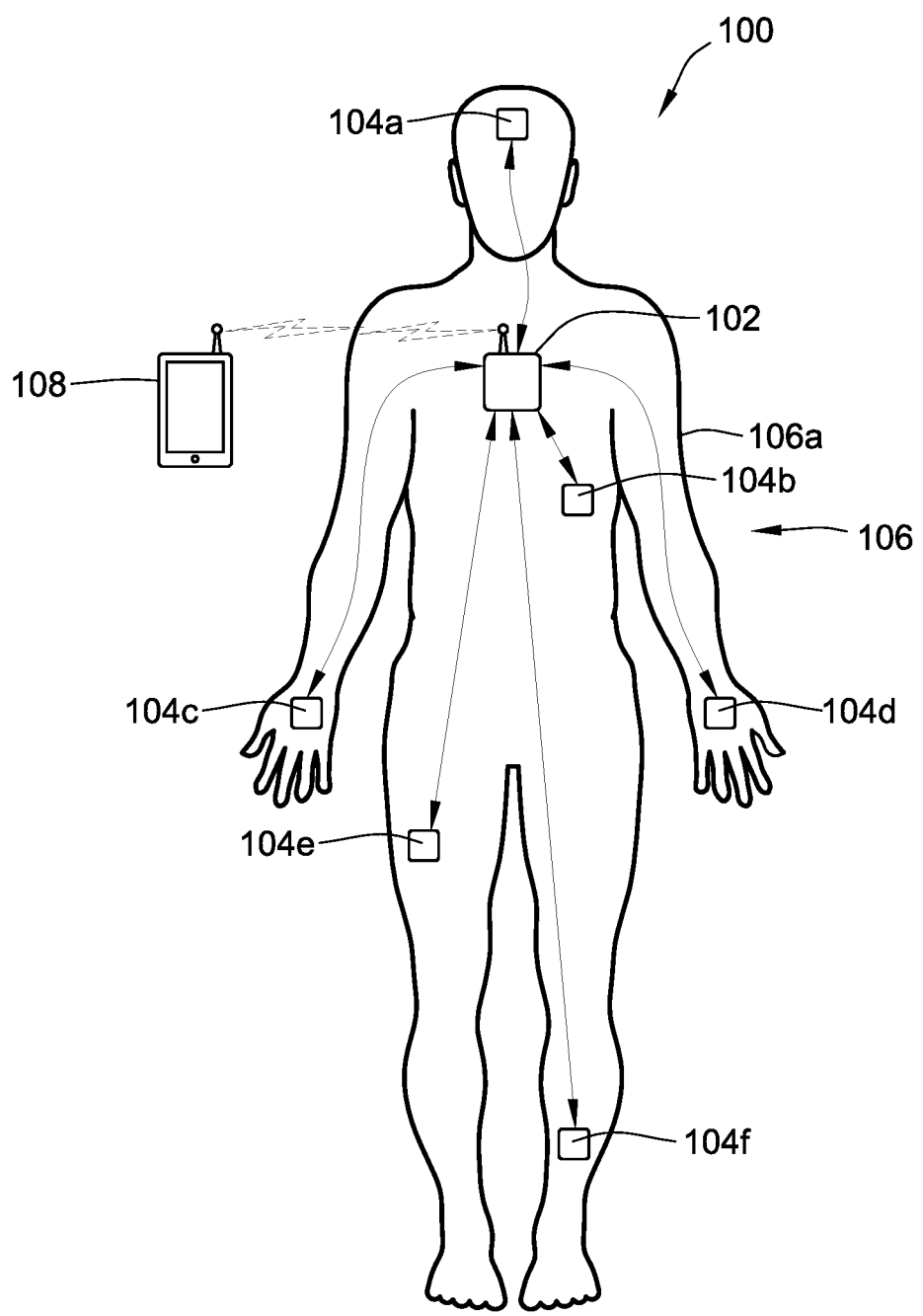
FIG. 1 is a schematic diagram of an on-body, multi-sensor system, in accord with aspects of the present disclosure.

Although the present disclosure contains certain exemplary embodiments, it will be understood that the disclosure is not limited to those particular embodiments. On the contrary, the present disclosure is intended to cover all alternatives, modifications, and equivalent arrangements as may be included within the spirit and scope of the disclosure as further defined by the appended claims.

The present disclosure is directed to an on-body, multi-sensor network. Within the network is a node, also referred to herein as a master node or master hub. The master hub provides the electrical power and/or data to the remaining nodes within the network, also referred to herein as sensor nodes or sensor patches. Both the master hub and the sensor nodes can be located on a body, such as a user's body (e.g., human or animal body). The sensor nodes can be distributed across the body and remote from (e.g., not physically connected to) the master hub.

The form factor of both the master hub and the sensor nodes can allow for the master hub and the sensor nodes to be placed on a regular or an irregular surface of an object (e.g., the body of the user, such as on the skin of the user). For example, the master hub and the sensor node can be provided with one or more adhesive surfaces (e.g., pressure sensitive adhesives, permanent adhesives, and/or removable adhesive elements such as adhesive tapes) in order to attach the master hub and the sensor node to the surface of the body of the user. In accordance with some embodiments, the master hub and/or one or more sensor nodes can be coupled (e.g., via adhesive, stitching, or hook and loop fasteners) to clothing, a bandage, or a brace that can be worn on the body and configured to position the master hub and/or one or more sensor nodes in contact with the surface of the body of the user. In accordance with some embodiments, the master hub and/or one or more sensor nodes can be held in place on the surface of the body by adhesive tape or a tight fitting garment, bandage or brace.

When coupled to the surface of an object, the master hub can supply electrical power and/or data to the sensor node through the surface of the object, such as through the skin of the body of a user. The sensor node acquires sensor information pertaining to the object, such as the body of the user, and operates based on the electrical power transmitted by the master hub through the object to the sensor node. Thus, the network operates based on the transmission of electrical power and/or data between nodes using a user's body (e.g., a human or animal body) as the transmission medium. More specifically, the network uses the skin of the user's body as the transmission medium for electrical power and/or data transmission. Biological tissues have noticeable reactance from 5 kHz to 1 MHz. The peak reactance is at 50 kHz. Bioimpedance of significant physiological interest lies between 10 kHz to 100 kHz. Beyond 100 kHz, the reactance drops rapidly allowing higher electrical current to be injected into the body safely. Alternatively, the reactance drop allows more reliable transmission of electrical signals through the body at lower currents. However, radio channels exist above 300 kHz. These radio channels can interfere with signal of interest. Therefore, the frequency band from 100 kHz to 300 kHz can be used for intra-body signal transmission with the least interferences. However, other frequency bands can be used for intra-body signal transmission depending on the application and transceiver technologies (e.g., spread spectrum and QAM) used. Other frequency bands that can be used for intra-body signal transmission include, for example, bands in the 5 KHz to 10 MHz range, the 2 MHz to 30 MHz range including the 3 MHz to 7 MHz range, and the 13 MHz to 20 MHz range.

According to some configurations of the present disclosure, the sensor nodes do not require separate on-board electrical power sources. Instead, the sensor nodes receive electrical power from the master hub transmitted across the skin of the user's body. In addition, signals and can be carried within the electrical power signals, allowing the master hub to both power and communicate with the sensor nodes.

Transmitting the electrical power and the data signals through the user's body alleviates the physical burdens imposed on sensor systems, such as each sensor node requiring a discrete, on-board power source (and signal wires to the hub), and facilitates a more streamlined and comfortable design. Moreover, with the master hub as the power source, the sensor nodes can be smaller and/or provide for greater functionality (e.g., additional sensors) and persistence by not requiring repeated removal from the user's body for recharging. By transmitting electrical power and/or data through the skin of the user's body, rather than over the air, the network can utilize lower power compared to comparable wireless methods, while also providing a higher level of security by not being susceptible to interception of over the air transmissions.

Turning now to the drawings, FIG. 1 shows an on-body, multi-sensor system 100, in accord with aspects of the present disclosure. The system 100 includes a master hub 102 and a plurality of sensor nodes 104a-104n (collectively referred to as sensor nodes 104). However, although illustrated and described as a multi-sensor system 100, the present invention includes the system 100 having only two nodes (e.g., the master hub 102 and one sensor node 104).

The master hub 102 provides electrical power and/or data to the sensor nodes 104 located across a body 106 of a user. More specifically, the master hub 102 transmits the electrical power and data to the sensor nodes 104 across the skin 106a of the body 106. In response to electrical power and data from the master hub 102, the sensor nodes 104 transmit data (e.g., response data) back to the master hub 102 across the skin 106a. The response data can include sensor information from one or more sensors of the sensor nodes 104, which is generated and/or collected based on the sensor nodes 104 receiving the electrical power from the master hub 102. Sensor information includes, for example, motion information (e.g., acceleration), temperature (e.g., ambient and of the sensor), electrical signals associated with cardiac activity, electrical signals associated with muscle activity, changes in electrical potential and impedance associated with changes to the skin, biopotential monitoring (e.g., electrocardiography (ECG), electromyography (EMG), and electroencephalogram (EEG)), bioimpedance monitoring (e.g., body-mass index, stress characterization, and sweat quantification), galvanic skin response information, and optically modulated sensing (e.g., photoplethysmography and pulse-wave velocity). The response data can also include status information about the status of the sensor node 104 including, for example, the configuration of the node (e.g., sensor operating parameters such as frequency or mode of operation). Thus, the master hub 102 supplies the sensor nodes 104 with electrical power rather than, for example, the sensor nodes 104 including on-board discrete power sources, such as chemical energy sources (e.g., batteries).

In some aspects, the master hub 102 is a standalone, dedicated master hub. In other aspects, the master hub 102 can be embodied in a device, an object, and/or an item. By way of example, and without limitation, the master hub 102 can be embodied in a device that is worn by the user, such as a fitness tracker, a smart watch, a wristband, jewelry (e.g., rings, earrings, bracelets, etc.), an article of clothing (e.g., shirts, gloves, hats, socks, pants, etc.) or protective gear (e.g., helmet or body or limb padding), etc., which contacts or is close to the skin 106a of the user. Further, although the user of FIG. 1 is illustrated as a human, the user can be any biological entity with skin that permits the transmission of electrical power and/or data.

The location of the master hub 102 on the body 106 can vary. In some aspects, the master hub 102 is centrally located on the body 106 so that the outlying sensor nodes 104 all are approximately the same distance from the master hub 102.

Exemplary locations for a centrally located master hub 102 include the chest, the back, the abdomen, the upper torso, and the like. By way of example, and without limitation, a master hub 102 centrally located on the body 106 can be embodied in an article of clothing. Alternatively, the master hub 102 may not be centrally located. Instead, the master hub 102 can be located on an extremity of the body 106, such as at the wrist, the ankle, the head, and the like. By way of example, and without limitation, a master hub 102 located around the wrist of the body 106 can be embodied in a smart watch. The master hub 102 can also be embedded (e.g., hidden) in other body worn elements, such as belts, shoes, hats, gloves, braces (e.g., wrist, ankle, knee, chest, neck braces). The master hub 102 can also be incorporated into devices that come in contact with a portion of the body, such as a seat, a handle (e.g., exercise bike, treadmill, elliptical machine, dumbbell, exercise bar), or standing platform or footrest.

In some aspects, the system 100 further includes a computer device 108. The computer device 108 can be any smart device, such as a smartphone, a tablet, a laptop, a desktop, etc., that is capable of communicating with the master hub 102. Data, such as sensor information, generated by the sensor nodes 104 can be transmitted back to the master hub 102 as response data. From the master hub 102, the response data can be transmitted to the computer device 108 for additional processing, analysis, storage, and/or transmission to additional devices or systems (e.g., the cloud, devices or systems remote from the system 100). Alternatively, the response data can be processed by the master hub 102 and processed response data can transmitted to the computer device 108 for additional processing, analysis, storage, and/or transmission to the cloud, additional devices or systems. Communications between the master hub 102 and the computer device 108 can be wired or wireless. Preferably, communications between the master hub 102 and the computer device 108 are based on wireless communication protocols such as, for example, Wi-Fi, Bluetooth, Bluetooth Low Energy, Zigbee, and the like. However, the wireless communications can be based on other protocols, including proprietary protocols, without departing from the concepts of the present disclosure.

Based on the master hub 102 transmitting the electrical power to the sensor nodes 104, the sensor nodes 104 do not require an internal or on-board power source. Accordingly, the sensor nodes 104 can fit on the body 106 in various locations without being constrained by the size, weight, and/or inflexibility of an on-board power source. In doing so, the system 100 facilitates the operation and placement of the sensor nodes 104. Further, the sensor nodes 104 can be optimized for the particular sensing modality of interest, which improves the sensor nodes 104 by allowing for better signal quality, better data collection, and the like. The electrical power and data transmitted from the master hub 102 to the sensor nodes 104 can be further tailored for each specific sensing modality, such as transmitting data in the form of specific algorithms for each sensor node 104 to execute.

In accordance with some embodiments, the sensor nodes 104 can include an onboard power storage component such as a battery or a capacitor configured to store power received from the master hub 102. In this configuration, the power received from by the sensor node 104 from the master hub 102 can be stored to allow the master hub 102 to be charged or replaced and to accommodate short duration power disruptions. The size of the power storage component can be determined based on the operating parameters of the sensor node 104, such as its operating power load.

In some aspects, the sensor node 104 is a standalone device. In other aspects, the sensor node 104 can be embodied in other devices, objects, and/or items that come into contact with the body 106. By way of example, and without limitation, the sensor node 104 can be embodied in a device, object, and/or item that is worn by the user, such as a wristband, jewelry (e.g., rings, earrings, bracelets, etc.), an article of clothing (e.g., shirts, gloves, hats, socks, pants, etc.) skin 106a of the user. By way of additional examples, the sensor node 104 can be embodied in furniture (e.g., chair, stool, bed, couch, etc.). In some aspects, the sensor node 104 can be embodied in objects found in a medical setting, such as a doctor's office, a hospital, and the like. Such specific examples include an examination chair, a hospital bed, and the like. Further, although the user of FIG. 1 is illustrated as a human, the user can be any biological entity with skin that permits the transmission of electrical power and/or data.

With the skin-based transmission of electrical power and/or data, the master hub 102 can estimate the locations of the sensor nodes 104 on the body 106 via the time required for communication signals to be transmitted and received from each sensor node 104, also referred to as time-of-flight. The time-of-flight can be used to approximate the distance between the master hub 102 and each sensor node 104. Time-of-flight can be measured using various methods. According to one method, the master hub 102 (or a sensor node 104) can emit a known signal, such as a brief pulse. In some aspects, the signal or brief pulse can include known content, such as known broadband frequency content. As the signal or brief pulse propagates across the body 106, the rate of change of phase with frequency increases. By measuring the change in the signal, and comparing the change to the original signal, the master hub 102 (or sensor node 104) can determine the travel time. Because the propagation speed of electrical signals through tissue is known, the travel time can be related to the travel distance, such as the travel distance between the master hub 102 and a sensor node 104, or between two sensor nodes 104. Thus, based on the travel time, the master hub 102 (or sensor node 104) can determine the distance between it and another sensor node 104. The determination of location can be based on a round trip (i.e., from the master hub 102, to the sensor node 104, and back to the master hub 102), or based on a one-way trip (i.e., from the master hub 102 and to the sensor node 104). In the case of a one-way trip, the sensor node 104 can be pre-programmed with information (e.g., known signal, frequency, etc.) of the on the brief pulse sent by the master hub 102 to determine the travel time.

If the master hub 102 knows its location on the body 106, based on the approximate distances between the master hub 102 and the sensor nodes 104, the master hub 102 can determine where the sensor nodes 104 are located on the body 106. With the known locations, the master hub 102 can vary one or both of the electrical power and data transmitted to the sensor nodes 104 based on a correspondence between the location of the sensor nodes 104 and, for example, the functionality and/or sensor modality associated with the location. In some aspects, the determination of the sensor node locations based on the approximate distance is sufficient for determining when and/or how to alter the electrical power and/or data sent to the sensor node 104. However, time-of-flight determination of the sensor node locations can be combined with additional location determination methodologies, such as location detection algorithms executed by the sensor nodes 104, to provide a more accurate estimation of the locations of the sensor nodes 104.

In some aspects, the sensor nodes 104 can be configured to determine the locations of the other sensor nodes 104. The master hub 102 can transmit electrical power and data to the sensor nodes 104 that cause the sensor nodes 104 to transmit location-related data. The other sensor nodes 104 can then receive the location-related data and respond back to the sensor nodes 104. This communication arrangement allows the sensor nodes 104 to determine the locations of the other sensor nodes 104 through travel times of the data.

Figure 2:
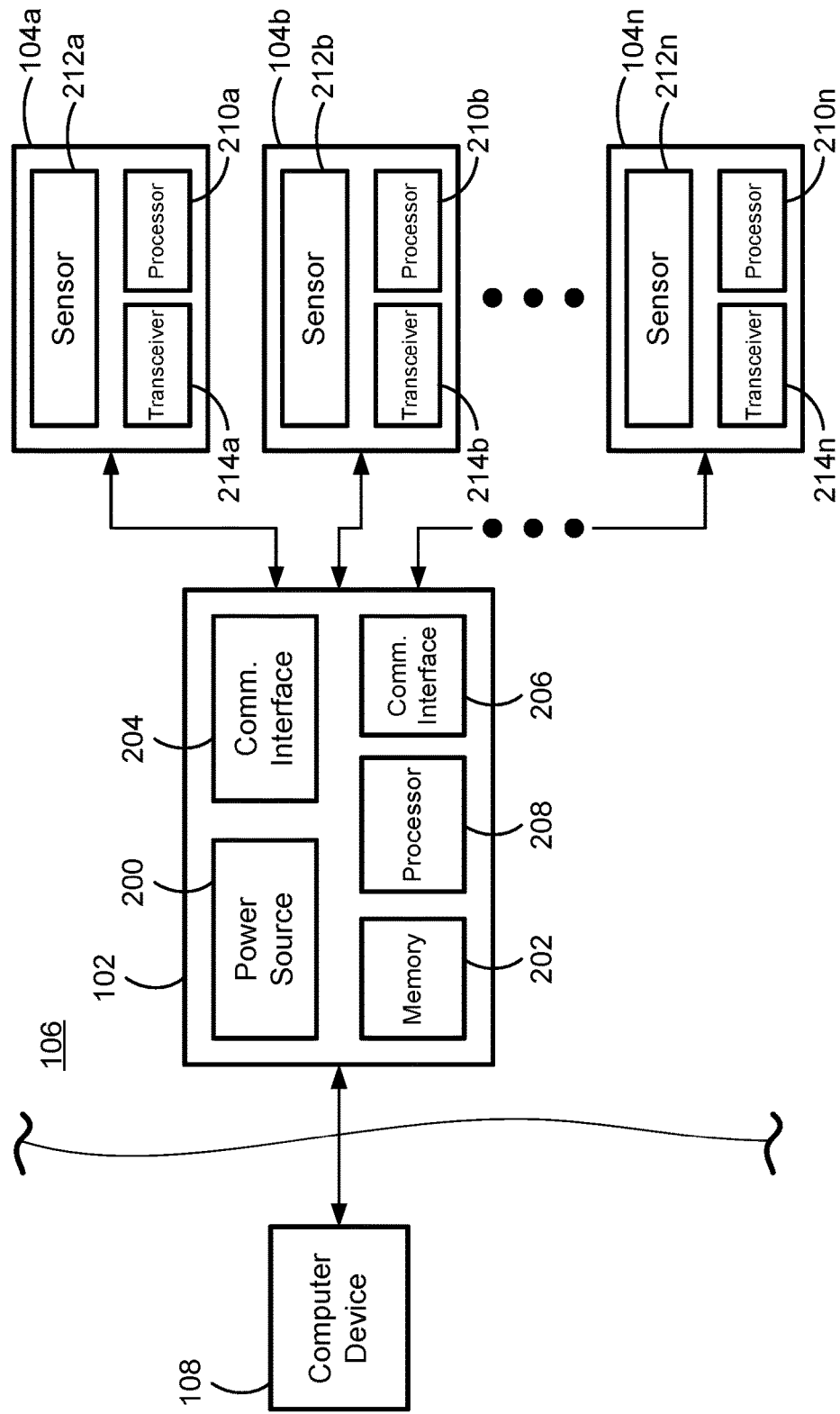
FIG. 2 is a schematic diagram of a master hub and sensor nodes of the on-body, multi-sensor system of FIG. 1, in accord with aspects of the present disclosure.

Referring to FIG. 2, FIG. 2 shows a schematic view of the master hub 102 and the sensor nodes 104 of FIG. 1, in accord with aspects of the present disclosure. Referring first to the master hub 102, the master hub 102 includes, for example, a power source 200, memory 202, a power transmitter and data transceiver 204 for communicating with the sensor nodes 104, a communications interface 206 for communicating with the computer device 108, and a processor 208.

The power source 200 provides the electrical power within the master hub 102 and to the sensor nodes 104 within the system 100. To any extent the master hub 102 may be constrained by the inclusion of an on-board power source 200, the location of the master hub 102 on the body 106 can be independent of a specific location. For example, whereas a sensor node 104 should be located in a location related to the sensor modality, the master hub 102 can be remote from the location without impacting the sensing. Thus, the placement of the master hub 102 within the system 100 is not negatively impacted by the inclusion of the power source 200. Further, the power source 200 can include various conventional power sources, such as a super-capacitor or one or more rechargeable or non-rechargeable batteries or cells having various battery chemistries, such as lithium ion (Li-ion), nickel-cadmium (NiCd), nickel-zinc (NiZn), nickel-metal hydride (NiMH), zinc and manganese (IV) oxide ($Zn/MnO_2$) chemistries, to name a few examples. In some aspects, the power source 200 can be an electrical wall outlet that the master hub 102 directly connects to, or connects to through, for example, a power adapter (e.g., alternating current adapter). In some aspects, the power source 200 can be a component that harvests non-electrical energy, such as thermal energy, kinematic energy, and/or radio-frequency energy, and converts the energy into electrical energy. However, the power source 200 can be various other power sources not specifically disclosed herein.

The memory 202 stores various instructions and algorithms for both the functioning of the master hub 102 and the sensor nodes 104. The memory 202 can be any type of conventional memory, such as read only memory (ROM), read-write memory (RWM), static and/or dynamic RAM, flash memory, and the like. In some aspects, data received from the computer device 108 can be written to the memory 202 for updating the instructions and algorithms stored on the master hub 102, such as for updating instructions and algorithms based on newly developed sensor nodes 104. And data from the memory 202 can be written to memory of the sensor node 104 to reconfigure them and, for example, update the firmware or other operating instructions of the sensor node 104.

The power transmitter and data transceiver 204 can be configured to transmit electrical power and data to the sensor nodes 104. The power transmitter and data transceiver 204 is configured to modulate the electrical power with the data, or data signals (e.g., analog signals), to transmit the data on the carrier of the electrical power. Thus, electrical power and data can then be received by the sensor nodes 104 and demodulated and/or rectified to cause the sensor nodes 104 to operate. More specifically, the power transmitter and data transceiver 204 generates a time-varying electromagnetic wave that propagates through the body 106 and is eventually received and rectified by sensor nodes 104. The power transmitter and data transceiver 204 can include a transceiver circuit comprised of an amplifier whose output drives an electrode coupled to the skin 106a. The transceiver circuit can include components such as, but not limited to, crystals, LC-tank oscillators, microelectromechanical system (MEMs) oscillators, processor general-purpose input/output (GPIO) ports, frequency synthesizers, and ring-oscillators to generate the output. The power output can be controlled by modifying the gain of the amplifier in real time. An adjustable impedance matching network may be included so that the maximum power is transmitted through the surface medium (e.g., skin 106a) to ensure the electromagnetic wave optimally propagates. The adjustable impedance matching network may include various capacitors, inductors, and resistors using various techniques such as, but not limited to, pi-matching, t-matching, and distributed matching networks.

The communications interface 206 can be any traditional communications interface for communicating with the computer device 108, such as one based on the wireless communication protocols of Wi-Fi, medical telemetry, Bluetooth, Bluetooth Low Energy, Zigbee, and the like, for example, based on open 2.4 gigahertz (GHz) and/or 5 GHz on radiofrequencies, and the like. However, as described above, the communications interface 206 can also support wired communications with the computer device 108.

The processor 208 controls the operation of the master hub 102. The processor 208 can be various types of processors, including microprocessors, microcontrollers (MCUs), etc., that are capable of executing programs and algorithms, and performing data processing. Specifically, the processor 208 executes one or more instructions and/or algorithms stored in the memory 202 or transmitted from the computer device 108, which cause the master hub 102 to transmit electrical power and data to the sensor nodes 104, receive response data from the sensor nodes 104, and aggregate, process, analyze, and/or store the response data. In some aspects, the processor 208 analyzes and/or processes the response data from the sensor nodes 104, such as the sensor information, prior to transmitting the response data to the computer device 108. In addition or in the alternative, the processor 208 can simply cause the master hub 102 to transmit the response data to the computer device 108, such as when the computer device 108 is actively communicating with the master hub 102.

Referring to the sensor nodes 104 of FIG. 2, the sensor nodes 104 can be location specific sensory platforms that are placed at specific locations on the body 106 for location-specific sensing. The sensor nodes 104 receive the transmitted electrical power and data from the master hub 102 to execute sensing, algorithms, and communicate back to the master hub 102. Further, because the sensor nodes 104 receive the electrical power from the master hub 102 required for operation, the sensor nodes 104 do not include discrete power sources for the overall operation of the sensor nodes 104 except that the sensor node can include power storage components, such as capacitors and even small batteries to provide power in the event of a temporary power disruption).

In some aspects, the sensor node 104 can stream sensor information back to the master hub 102. Such a sensor node 104 can be considered a simple node. Alternatively, the sensor node 104 can store the sensor information on the sensor node 104 prior to transmitting the sensor information to the master hub 102. Still further, the sensor node 104 can alternatively process the sensor information prior to transmitting the sensor information to the master hub 102. Processing of the sensor information can include, for example, smoothing the data, analyzing the data, compressing the data, filtering the data, and the like. Such a sensor node 104 can be considered a smart node. Thus, the functionality of the sensor node 104 can vary.

The configuration of the sensor nodes 104 can vary depending on the specific modality and/or functionality of the sensor(s). However, in general, the sensor nodes 104 include a processor 210, one or more sensors 212, and an electrical power receiver and data transceiver 214.

The processor 210 performs the digital signal processing and data analysis of the sensor information generated and/or collected by the one or more sensors 212. In some aspects, the data analyses of the sensor information includes, for example, executing one or more processes for smoothing the data, analyzing the data, compressing the data, filtering the data, and the like. In some aspects, the processing includes executing one or more stored or transmitted (e.g., from the master hub 102) pattern recognition algorithms to detect one or more pre-defined patterns in the data. However, in some instances, the data or sensor information (e.g., raw data) can be streamed back to the master hub 102 without being processed. Instead, for example, the processing and/or analyzing of the data or sensor information can instead be solely performed at the master hub 102 or the computer device 108. The processor 210 can be various types of processors, including microprocessors, MCUs, etc., that are capable of executing algorithms and data processing, particularly based on the lower electrical power levels transmitted from the master hub 102. In some aspects, the processor 210 can include memory for storing one or more algorithms performed by the sensor nodes 104, and for storing information transmitted from the master hub 102. Alternatively or in addition, the sensor nodes 104 may include memory that is independent from the processor 210. In some embodiments, the sensor nodes 104 are slave nodes or dumb nodes and function based only on the data communication from the master hub 102 and do not include instructions, algorithms, or other data required for functioning. Alternatively, the sensor nodes 104 can be smart nodes that receive electrical power and triggering signals and/or instructions (e.g., data) from the master hub 102, but include the necessary instructions, algorithms, or data internally for generating and/or collecting sensor data and transmitting sensor data and other information back to the master hub 102. By way of example, and without limitation, the processor 210 can be a Cortex-M Series MCU by ARM® Ltd., an MSP430 MCU by Texas Instruments Inc., and the like.

The one or more sensors 212 perform the sensing functionality on the sensor nodes 104. The sensors 212 can be various types of sensors having various types of sensing modalities. According to some embodiments, the sensors 212 include heat flux sensors, accelerometers or gyroscopes (e.g., motions sensors), electrocardiogram (ECG or EKG) sensors, pressure sensors, heart rate monitors, galvanic skin response sensors, sweat sensors, non-invasive blood pressure and blood oxygen saturation monitors, pedometers, optical sensors, acoustic sensors, blood glucose sensors, and the like. However, the sensor nodes 104 can include additional sensors not explicitly disclosed herein without departing from the spirit and scope of the present disclosure. By way of some specific examples, the one or more sensors 212 can include an ADS1191 biopotential sensor by Texas Instruments, Inc., an ADXL362 accelerometer by Analog Devices, and the like.

In some aspects, one or more components of the sensor nodes 104 independent of the sensors 212 can be considered a sensor. For example, components of the sensor nodes 104 configured to receive electrical power and transmit and receive data can also be configured for sensing. Specifically, electrical contacts used for receiving the electrical power can be configured to function as galvanic skin sensors, ECG or EKG sensors, and the like. Accordingly, in some aspects, a sensor node 104 may not include a sensor 212, per se, where the components of the sensor node 104 themselves are capable of sensing characteristics and/or properties of the skin 106a and/or the body 106.

The electrical power receiver and data transceiver 214 allows the sensor nodes 104 to receive electrical power from the master hub 102, and to receive data from and transmit data to the master hub 102, as well as from and to the other sensor nodes 104 within the system 100. The transceiver 214 extracts the data and the electrical power from the received signals to both power the sensor node 104 and provide the data for executing algorithms and processing data generated by the sensors 212. The data can include instructions and/or commands to the sensor nodes as well as firmware updates and other programs or algorithms to be executed by the sensor node. The transceiver 214 functions based on the properties of the skin 106a of the body 106 as described above with respect to the power transmitter and data transceiver 204.

Figure 3:
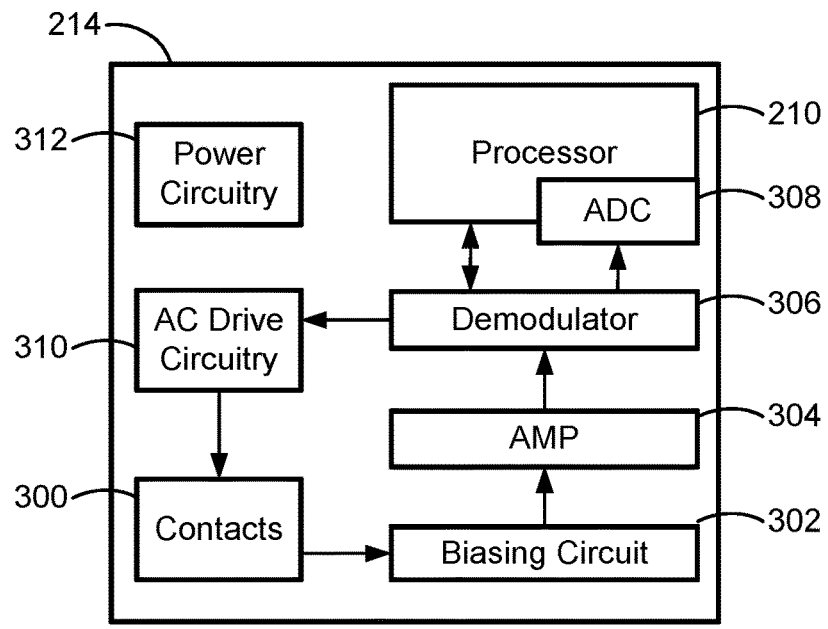
FIG. 3 is a detailed schematic diagram of an electrical power and data transceiver of a sensor node, in accord with aspects of the present disclosure.

FIG. 3 shows a detailed schematic of the transceiver 214, in combination with the processor 210, in accord with aspects of the present disclosure. Although described with respect to the transceiver 214, as mentioned above, the power transmitter and data transceiver 204 of the master hub 102 can include similar components as the transceiver 214 for transmitting and receiving electrical power and data transmission. In some aspects, the transceiver 214 includes one or more electrical contacts 300, a biasing circuit 302, an amplifier 304, a demodulator 306, an analog-to-digital converter 308, an alternating current drive circuitry 310, and a power circuitry 312.

The electrical contacts 300 are formed of conductive material (e.g., copper, silver, gold, aluminum, etc.) and provide the interface between the sensor node 104 and the skin 106a, or the sensor node 104 and the air gap between the sensor node 104 and the skin 106a, for receiving electrical power and transmitting and receiving data communication. The sensor node 104 may include one or more electrical contacts 300. In some aspects, the sensor node 104 includes four contacts, with two contacts for receiving and two contacts for transmitting. In some aspects, the contacts 300 can be four contacts 300 configured as 4-wire measurement electrodes.

For alternating electrical power transmitted into the skin, at around 300 kHz or higher, the alternating electrical power can be detected non-contact to the signal for as far as a few millimeters from the skin. Hence, the electrical contacts can be operated without being in contact with the skin. Thus, in terms of the master hub 102 discussed above, as well as the sensor nodes 104, the electrical contacts 300 do not need intimate coupling to the skin. However, in some aspects, a master hub 102 configured with electrical contacts that do not contact the skin is equipped with a higher power transmitter. Without the requirement for direct skin contact, the master hub 102 can be embodied in, for example, a smart watch, a fitness tracker, or other device powered by a power source that is loosely secured to the body 106, without always being in direct contact with the skin 106a. Accordingly, both the master hub 102 and the sensor nodes 104 can be skin mounted or non-contact mounted. For skin-mounted nodes, the electrical contacts are resistively coupled to the skin. For non-contact mounted nodes, the electrical contacts are capacitively coupled to the skin with a skin to electrode distance of less than a few millimeters, such as less than or equal to about 3 mm.

As represented by the adjoining arrow, the contacts 300 can be electrically connected to and in communication with a biasing circuit 302, such as an analog front-end biasing circuit. The biasing circuit 302 biases the data communication signal from the master hub 102, or other sensor nodes 104, for further processing by the components of the sensor node 104. The other components that perform the processing include, for example, the amplifier 304, which amplifies the data signal received from the master hub 102, or other sensor nodes 104. As represented by the adjoining arrow, the amplifier 304 can be electrically connected to and in communication with the biasing circuit 302. The other components also include the demodulator 306, which demodulates the electrical power and data signal from the master hub 102 to separate the data from the electrical power. As represented by the adjoining arrow, the demodulator 306 can be electrically connected to and in communication with the amplifier 304 for demodulating the amplified data. In combination with the analog-to-digital converter 308, the demodulator 306 digitizes the extracted data and forwards the digitized data to the processor 210. As represented by the adjoining arrows, the demodulator 306 can be directly electrically connected to and in communication with both the analog-to-digital converter 308 and to the processor 210. As represented by the 2-way arrow, the processor 210 transmits information back to the demodulator 306 for transmission to the master hub 102. By way of example, and without limitation, the demodulator 306 can be a synchronous demodulator and configurable analog filter, such as the ADA2200 made by Analog Devices, Inc. Further, although described herein as a demodulator, in some aspects, the demodulator 306 can instead be a modem.

As represented by the adjoining arrow, the demodulator 306 can be electrically connected to and in communication with alternating current drive circuitry 310. The alternating current drive circuitry 310 generates alternating current pulses, or response data, for communicating with the master hub 102 and, potentially, with the other sensor nodes 104 within the system 100. The alternating current drive circuitry 310 is controlled by the processor 210 to generate the alternating current pulses for responding to the master hub 102, and potentially the other sensor nodes 104 within the system 100.

The power circuitry 312 controls the electrical power at the sensor node 104 for executing algorithms and data processing based on the electrical power from the master hub 102. In some embodiments, the power circuitry 312 includes a capacitor or similar type of temporary power storage component that stores power received from the master hub 102 during execution of the algorithms and processing of the data or sensor information. However, the power stored in the capacitor or similar type of temporary power storage component is received from the master hub 102, rather than being originally in the power source itself, such as in a chemical energy power source (e.g., battery).

Although electrical power and data transmission signals can be transmitted through the skin 106a, noise may be introduced into signals. In part because of the noise, time stamping of the signals presents some issues. Accordingly, the above described circuitry of the master hub 102 and the sensor nodes 104 include circuitry to remove the noise and recover the underlying signals. In some aspects, the circuitry is a phase lock loop (PLL). Moreover, most physiological sensors generate data less than a few hundred bytes a second. Data communication at about 300 to about 1200 baud is enough for transmitting real time data for the sensors and the corresponding sensor nodes 104. A noise rejecting circuit based on a PLL with a carrier frequency between about 100 kHz and about 300 kHz, and a bandwidth of about 30 kHz, can transmit data communication at 1200 baud with simple communication scheme. Moreover, such a noise rejecting circuit can also detect the electrical current pulses described above, as well as measure bioimpedance. Based on this arrangement, as many as about 66 channels, one for each sensor node 104, can be allocated.

Although not shown, in some aspects, the sensor nodes 104 can include wired interfaces for connecting to one or more external sensors or other nodes within the system 100. The wired interfaces can be various types of interfaces, particularly for connecting to components that use low power, such as an $I^2C$ interface and the like. Further, in some aspects, the sensor nodes 104 include components that provide for near-field communication (NFC) capability, or other similar low-power, wireless communication protocols, for episodic sampling upon interrogation by a reader. For example, in addition to one or more electrical contacts for receiving the electrical power and data from the master hub 102, the sensor nodes 104 can include a wire coil for interrogation by a NFC-capable smart device (e.g., smartphone, tablet, and the like).

Figure 4:
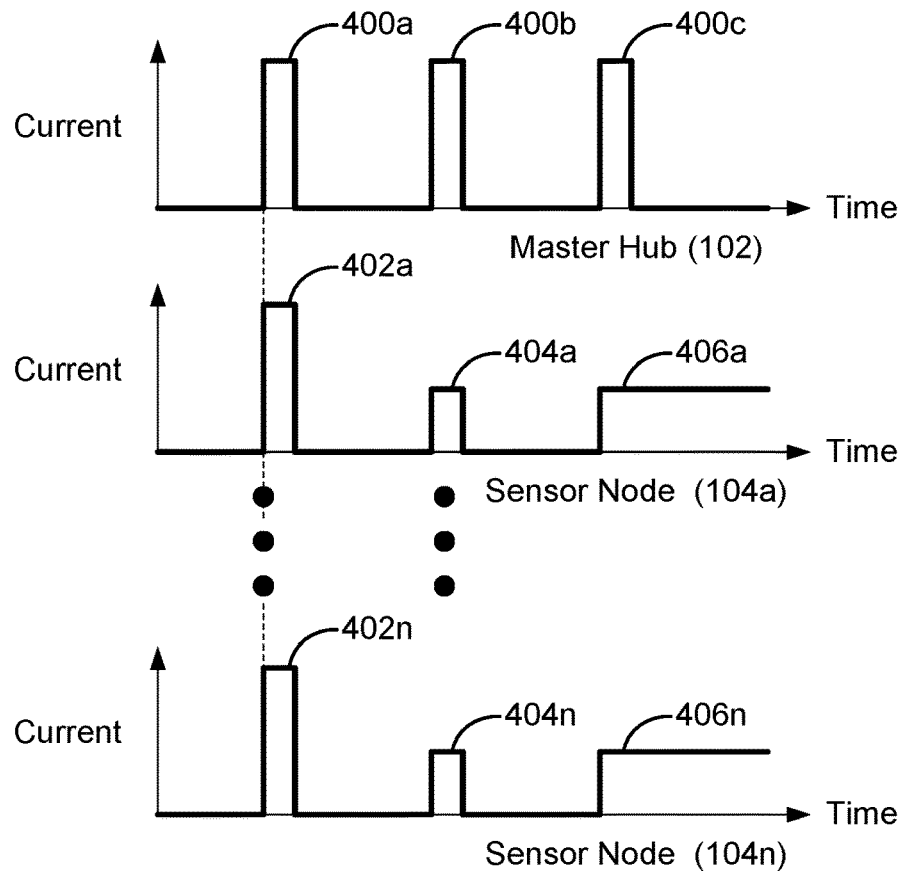
FIG. 4 is a timing diagram of electrical power and data transmission within the on-body, multi-sensor system of FIG. 1, in accord with aspects of the present disclosure.

Referring to FIG. 4, FIG. 4 is a timing diagram of electrical power and data transmission within the on-body, multi-sensor system 100 of FIG. 1, including data synchronization, in accord with aspects of the present disclosure. The transmission of the electrical power and data relies on an electrical current being able to travel across the skin 106a of the body 106, similar to an electrical current traveling through water. Indeed, the propagation velocity of the electrical current across the skin 106a is approximately one-tenth of the speed of light. Further, the longest conductive path between any two points on the body 106 is about 2 meters. Therefore, the signal propagation delay of an electrical signal from one point to another point across the body 106 is about 70 nanoseconds (ns). This delay is below the synchronization requirement of a majority of the physiological sensors for proper interpretation of the signals.

For synchronization, the master hub 102 first transmits an electrical current pulse 400a into the skin 106a of the body 106. The electrical current pulse 400a is of a fixed duration and amplitude, or amplitude pattern, and at a dedicated frequency channel for initial synchronization. According to some aspects, the master hub 102 continuously, periodically, semi-periodically, or on-demand transmits the electrical current pulse 400a so that sensor nodes 104 newly placed on the body 106 can be synchronized within the system 100.

The sensor nodes 104 on the body 106 then detect the electrical current pulse 400a, as shown by the received electrical current pulses 402a-402n (collectively received current pulses 402). The sensor nodes 104 detect the electrical current pulse 400a with less than about 1 microsecond (μs) of a delay. The sensor nodes 104 then transmit acknowledge pulses 404a-404n (collectively acknowledge pulses 404) after a pre-determined delay and for the master hub 102 to detect, as indicated by the received current pulse 400b. A synchronized signal acquisition can then be undertaken by the sensor nodes 104. Specifically, the master hub 102 transmits an electrical power and data pulse 400c, which triggers the synchronized signal portions 406a-406n (collectively synchronized signal portions 406). The electrical current pulse 400c is of a fixed duration and amplitude, or amplitude pattern, and at a dedicated frequency channel for triggering, which is different than the initial frequency initialization channel. The timing and synchronization scheme and system architecture to perform sensor synchronization and measurement triggering disclosed above enables sensor nodes 104 to synchronize at time delays less than 1 μs and power levels of about 1.5 milliwatts (mW), which is lower than radio frequency wireless communication.

Figure 5A:
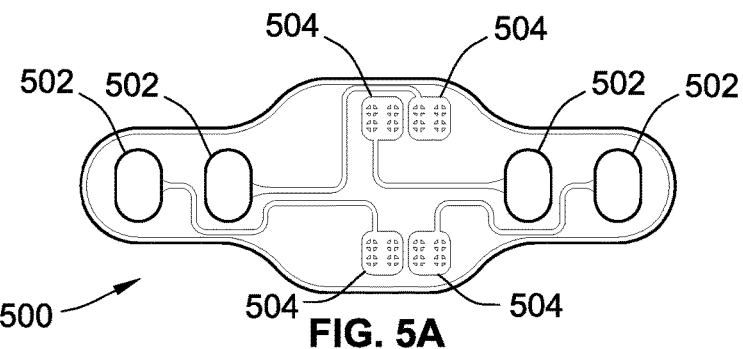
FIG. 5A is a bottom view of a schematic diagram of an exemplary sensor node, in accord with aspects of the present disclosure.
Figure 5B:
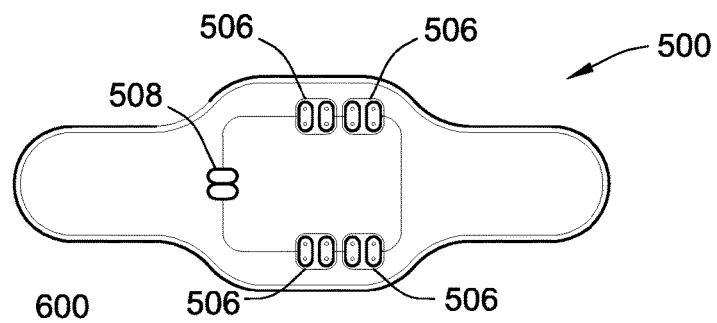
FIG. 5B is a top view of a schematic diagram of the exemplary sensor node of FIG. 5A, in accord with aspects of the present disclosure.

Referring to FIGS. 5A and 5B, an exemplary sensor node 500 is shown, in accord with aspects of the present disclosure. By way of example, and without limitation, the sensor node 500 may be a conformal sensor node formed of a flexible substrate and circuit for conformal attachment to the surface (e.g., skin 106a) of a user. The sensor node 500 is configured to generate sensor information associated with the user upon which the sensor node 500 is attached.

FIG. 5A shows the bottom of the sensor node 500, and FIG. 5B shows the top of the sensor node 500. As shown in FIG. 5A, the sensor node 500 includes four contacts 502 (e.g., contacts 300). The contacts 502 contact the skin 106a of a user to receive and transmit signals, such as the electrical power and/or data, from and into the skin. However, in some embodiments, a small air gap can be between the contacts 502 and the skin 106a, and the signals can be transmitted across the air gap, as described above.

In some aspects, two of the contacts 502 are electrically configured and/or wired within the circuit of the sensor node 500 to receive the electrical power and/or data, and the other two of the contacts 502 are electrically configured and/or wired within the circuit of the sensor node 500 to transmit electrical power and/or data. However, in some aspects, all of the contacts 502 can be electrically configured and/or wired to both transmit and receive the electrical power and/or data. Further, although only four contacts 502 are shown, the number of contacts may vary. For example, the sensor node 500 may have one or more contacts 502.

As described above, the contacts 502 may also be used by the sensor node 500 to generate sensor information. For example, the sensor node 500 may be a galvanic skin sensor. One or more of the contacts 502 may be electrically configured and/or wired to generate sensor information with respect to, for example, bioimpedance, in addition to receiving and transmitting electrical power and/or data. Thus, in the case of sensor node 500, the sensors (e.g., sensors 212) are, in part, the contacts 502.

The sensor node 500 further includes sets of vertical interconnects accesses (VIAs). Specifically shown in FIG. 5A are the bottoms 504 of the sets of VIAs. The VIAs transfer the electrical power and/or data between layers of the circuits of the sensor node 500. For example, the bottoms 504 of the sets of VIAs are electrically connected to the contacts 502 to transfer the electrical power and/or data from a bottom circuit layer of the sensor node 500 to a top circuit layer of the sensor node 500.

Referring to FIG. 5B, FIG. 5B shows the tops 506 of the sets of VIAs. The tops 506 of the sets of VIAs are electrically connected to a top circuit layer of the sensor node 500 for providing the electrical power and/or data to the top circuit layer. With respect to the sensor node 500, the sensor node 500 includes one or more components within the top circuit layer for analyzing and/or processing the electrical power and/or data signal received by the contacts 502. For example, although not shown, the sensor node 500 can include the processor 210 and the transceiver 214 above the tops 506s of the VIAs. The processor 210 and the transceiver are electrically connected to the tops 506 of the VIAs so as to be electrically connected to the contacts 502. Based on the processor 210 and the transceiver 214 being electrically connected to the contacts 502, the processor 210 rectifies the electrical power and the transceiver demodulates the data received at the contacts 502. The processor 210 can then process the sensor information to be transmitted back to a master hub (e.g., master hub 102) through the contacts 502 and the skin 106a of the body 106. In some aspects, the sensor node 500 further includes a grounding line 508.

According to the configuration of the sensor node 500, the sensor node 500 can be placed on various locations of the body 106. Further, because the sensor node 500 does not have an on-board power source, the sensor node 500 receives the electrical power for operation by receiving electrical power transmitted from a master hub (e.g., master hub 102) located on the body 106 but remote (e.g., not directly connected) from the sensor node 500. The electrical power, along with the data from the master hub 102, is received by one or more of the contacts 502 and electrically powers the sensor node 500.

Figure 6A:
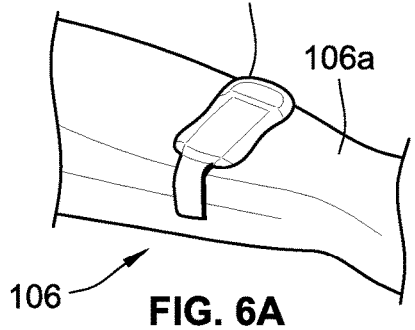
FIG. 6A is a diagram of an integrated master hub placed on the body of a user, in accord with accord with aspects of the present disclosure.
Figure 6B:
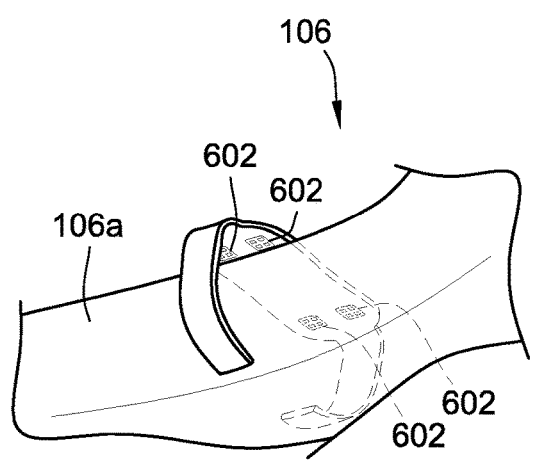
FIG. 6B is a diagram of contacts of the master hub of FIG. 6A in relation to the body of the user, in accord with aspects of the present disclosure.
Figure 6C:
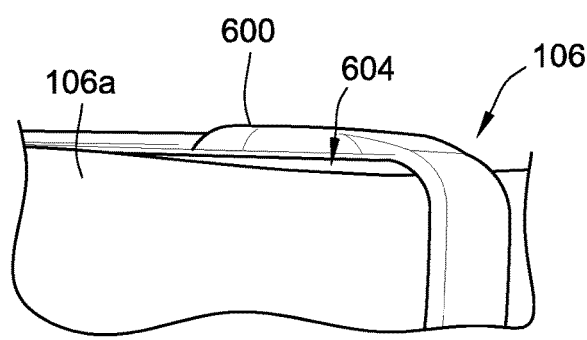
FIG. 6C is a diagram of a gap between the master hub and the body in FIG. 6A, in accord with aspects of the present disclosure.

Referring to FIGS. 6A-6C, a master hub 600 is shown coupled to the body 106 of a user, in accord with aspects of the present disclosure. Referring to FIG. 6A, the master hub 600 may be, for example, integrated into a smart watch. Specifically, the master hub 600 may be integrated into the wristband of the smart watch. However, the master hub 600 can be integrated into any one of the devices discussed above. Based on the master hub 600 being integrated into a smart watch, or the wrist band of the smart watch, the master hub 600 is attached to, for example, the skin 106a around the wrist of the user's body 106.

Although not shown (for illustrative convenience), the master hub 600 includes a power source (e.g., power source 200). The power source powers both the master hub 600 and the smart watch, such as the time keeping functionality and the communications functionality of the smart watch with an off-body device (e.g., computer device 108), such as a smartphone that is communication with the smart watch, etc.

Referring to FIG. 6B, the master hub 600 includes contacts 602. Although four contacts 602 are shown, the master hub 600 can have one or more contacts. Similar to the contacts 502, the contacts are made of a conductive material (e.g., copper, silver, gold, aluminum, etc.). Through the contacts 602, the master hub 600 transmits and receives electrical power and/or data to and from the skin 106a. The contacts 602 may be in contact with the skin 106a. Alternatively, the contacts 602 may not be in contact with the skin 106a. For example, depending on how loose the wristband is, the contacts 602 may not always be in contact with the skin 106a.

Referring to FIG. 6C, FIG. 6C shows a gap 604 that may be between the contacts 602 (FIG. 6B) and the skin 106a. Despite the gap 604, the higher energy reserve of the smart watch allows the master hub 600 to transmit electrical power and/or data across the air gap 604, as discussed above. For example, as discussed above, at around 300 kHz or higher, alternating current signals can be detected non-contact to the skin 106a for as far as a few millimeters from the skin 106a. Therefore, the master hub 600 can be operated non-contact while still enabling electrical power and/or data transfer into the skin.

Although the foregoing disclosure is generally related to transmitting electrical power and data transmission between the master hub 102 and the sensor nodes 104, according to some aspects, only electrical power or only data can be transmitted between the master hub 102 and the sensor nodes 104. For example, only electrical power can be transmitted by the master hub 102 to the sensor nodes 104 for smart sensor nodes 104 that do not require transmitted data.

According to the above disclosure, the system 100 enjoys benefits over other multi-sensor systems on a user's body. For example, the system 100 can be used in applications where multi-modal sensing is required, and where the specific modality of the sensing may vary across users or may vary over time for the same user. For example, a user who wishes to go for a run can use the system 100 to log heart rate, gait, posture, and sweat rate by using sensor nodes 104 optimized for each of these sensing modalities. The master hub 102 can aggregate the data from each sensor node 104, fusing the data into insightful characteristics about the activity the user is performing. Moreover, a user can quickly and easily change the modalities of the system by changing the sensor nodes 104 on the user's body. Further, the form factor of the sensor nodes 104 can be smaller, less obtrusive, and more conformal, while still enjoying the benefits of, for example, continuous data generation by an on-body node (e.g., master hub 102) rather than, for example, periodic data generation based on interrogation of the sensor nodes 104 by an off-body computer device.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A method of synchronizing nodes within an on-body sensor network, the method comprising:

transmitting, by a master hub located on a surface of a user, an initialization electrical current pulse into the surface;

receiving, by at least one sensor node located on the surface, the initialization electrical current pulse from the surface;

transmitting, by the at least one sensor node, an acknowledge electrical current pulse into the surface after a pre-determined delay and in response to receipt of the initialization electrical current pulse;

detecting, by the master hub, the acknowledge electrical current pulse;

transmitting, by the master hub, a triggering electrical current pulse into the surface, the triggering electrical current pulse including electrical power and data; and receiving, by the at least one sensor node, the triggering electrical current pulse from the surface, the electrical power and data triggering the at least one sensor node to begin generating sensor information.

2. The method of claim 1, further comprising:

transmitting, by the at least one sensor node, response data including the sensor information into the surface; and receiving, by the master hub, the response data from the surface.

3. The method of claim 2, further comprising:

transmitting, by the master hub, the response data including the sensor information to a computer device located off of the user.

4. The method of claim 1, wherein the initialization electrical current pulse is of a fixed duration and a fixed amplitude, and at a dedicated initialization frequency.

5. The method of claim 4, wherein the triggering electrical current pulse is of a fixed duration and a fixed amplitude, and at a dedicated triggering frequency, different than the dedicated initialization frequency.

6. The method of claim 1, wherein the initialization electrical current pulse and the triggering electrical current pulse are about 1.5 milliwatts.

7. The method of claim 1, wherein the master hub transmits the initialization electrical current pulse continuously, periodically, semi-periodically, or on-demand.

* * * * *